United States Patent [19]

Amano et al.

[11] Patent Number: 5,136,577
[45] Date of Patent: Aug. 4, 1992

[54] SUB-BAND ACOUSTIC ECHO CANCELLER

[75] Inventors: Fumio Amano, Tokyo; Hector M. P. Meana, Hino, both of Japan

[73] Assignee: Fujitsu Limited, Kawasaki, Japan

[21] Appl. No.: 658,180

[22] Filed: Feb. 20, 1991

[30] Foreign Application Priority Data

Feb. 21, 1990 [JP] Japan ................................. 2-40805
Sep. 14, 1990 [JP] Japan ................................. 2-245827

[51] Int. Cl.$^5$ .......................... H04B 3/21; H04M 9/08
[52] U.S. Cl. .................... 370/32.1; 379/410; 379/411
[58] Field of Search ............... 370/32.1; 379/410, 411

[56] References Cited

U.S. PATENT DOCUMENTS

| 4,623,980 | 11/1986 | Vary | ...................... | 380/6 X |
| 4,712,235 | 12/1987 | Jones, Jr. | ...................... | 379/410 |
| 5,001,701 | 3/1991 | Gay | ...................... | 370/32.1 |

FOREIGN PATENT DOCUMENTS 1001373 10/1989 Belgium .
0065210 11/1982 European Pat. Off. .
2729109 1/1979 Fed. Rep. of Germany .
298257 12/1987 Japan .
29153 1/1989 Japan .

OTHER PUBLICATIONS

A. Gilloire, "Experiments With Sub-Band Acoustic Echo Cancellers for Teleconferencing", ICASSP '87, 1987.
W. Kellermann, "Analysis and Design of Multirate Systems for Cancellation of Acoustical Echoes", ICASSP '88, 1988.
Gay et al., "Fast Converging Subband Acoustic Echo Cancellation Using Rap on the WE DSP16A", ICASSP '90, 1990.
Perez et al., "A New Subband Echo Canceler Structure", The Transactions of the IEICE, vol. E73, No. 10, Oct. 1990.
Nakayama et al., "A Sub-Band Adaptive Filer Using Oversampling Filter Banks", Society of Applied Acoustics, Apr. 20, 1989.
International Conference on Acoustics, Speech, and Signal Processing, New York, Apr. 11–14, 1988, vol. 5, pp. 2574–2577, IEEE, New York, US; J. Chen et al.: "A New Structure for Sub-Band Acoustic Echo Canceler".

Primary Examiner—Douglas W. Olms
Assistant Examiner—Russell W. Blum
Attorney, Agent, or Firm—Helfgott & Karas

[57] ABSTRACT

A sub-band acoustic echo canceller includes a first division and decimation process part for dividing a reception signal from a line into first band signals of N channels and for decimating each of the first band signals to output decimated first band signals in a form of complex signals, where N is an integer greater than or equal to two, a second division and decimation process part for dividing a transmission signal into second band signals of N channels and for decimating each of the second band signals to output decimated second band signals in a form of complex signals, an echo canceller group made up of a group of echo cancellers for generating a pseudo echo in each band based on a corresponding one of the decimated first band signals received from the first division and decimation process part by referring to a corresponding one of the decimated second band signals received from the second division and decimation process part and for outputting a residual signal in each band by subtracting the pseudo echo of one band from the decimated second band signal of the same band, and an interpolation and synthesis process part for subjecting the residual signals received from the echo canceller group to interpolation and synthesis to output a synthesized residual signal which is transmitted to a line as the transmission signal, where the echo canceller group carries out an echo cancelling operation for each band in a complex signal region.

19 Claims, 18 Drawing Sheets

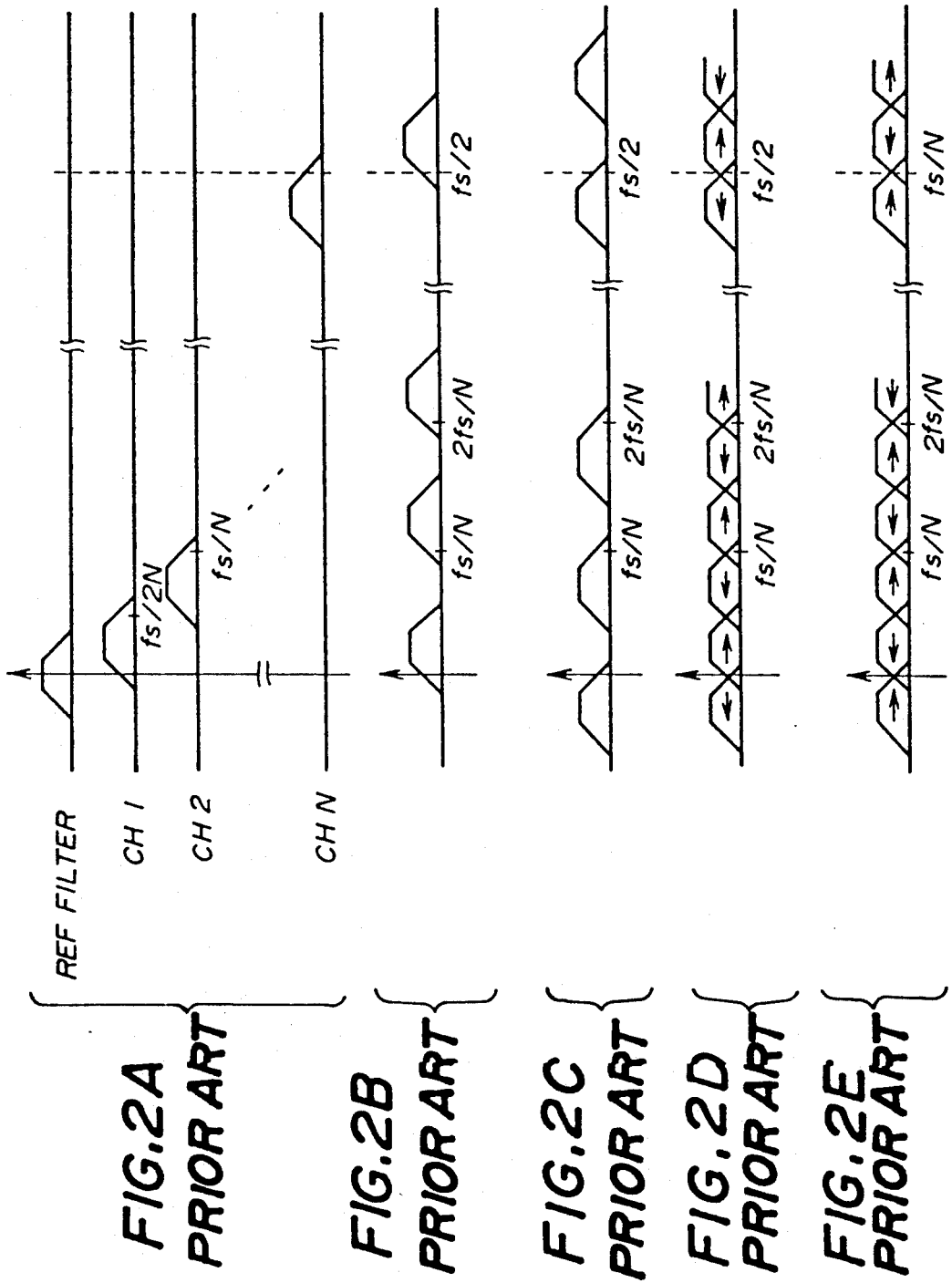

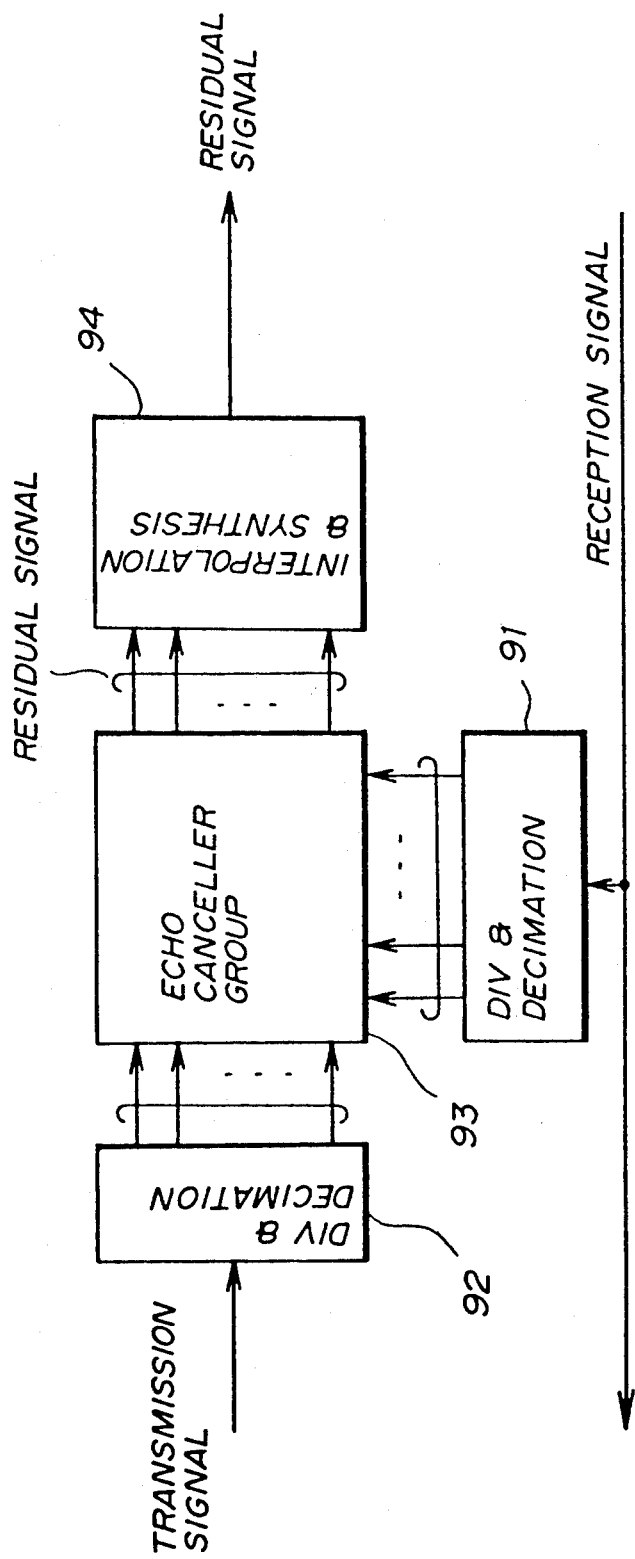

SUB-BAND ACOUSTIC ECHO CANCELLER

BACKGROUND OF THE INVENTION

The present invention generally relates to echo cancellers, and more particularly to a sub-band acoustic echo canceller which is applicable to a video/audio conference communication systems, long-distance communication systems and the like.

In long-distance communication systems such as satellite communication and submarine cable communication systems, an echo deteriorates the quality of the call. This echo occurs when a signal which is received from a calling station at a receiving station returns to the calling station with a transmission signal from the receiving station due to a mismatch of a hybrid transformer in a two-wire/four-wire converter part. On the other hand, in video/audio conference systems and loudspeaker telephone sets, the sound output from a speaker is reflected by walls of the room or the like and mixes in as an input to a microphone thereby generating an echo sound.

An echo canceller is used to cancel the above described echo. But in the video/audio conference system, for example, the impulse response of the system from the speaker to the microphone becomes extremely long. As a result, the number of tap coefficients required becomes extremely large when the normal finite impulse response (FIR) type echo canceller is used, and the scale of the hardware becomes extremely large.

In order to solve the above described problem, a sub-band acoustic echo canceller has been proposed. Although the scale of the hardware of this sub-band acoustic echo canceller is small, the quality of the call after the echo cancellation is poorer compared to the general echo canceller and there is a demand to realize a sub-band acoustic echo canceller having an improved performance.

FIG. 1 shows an example of a conventional sub-band acoustic echo canceller. This echo canceller is applied to a video/audio conference system, for example, and an audio signal received from a line is output from a speaker 8 while an audio signal input from a microphone 9 is transmitted to a line.

In FIG. 1, a division and decimation process part 10 includes a filter bank 101 and a decimation part 102. The filter bank 101 is made up of quadrature mirror filters (QMFs) and divides a received signal into N band signals in corresponding bands of N channels CH1 through CHN. The band signals in the respective bands are subjected to a 1/N decimation in the decimation part 102 before being supplied to an echo canceller group 40. The 1/N decimation is a process in which one sample is successively extracted from N samples.

A division and decimation process part 20 has the same structure as the division and decimation process part 10, and includes a filter bank 201 and a decimation part 202. The N band signals from the decimation part 202 are supplied to the echo canceller group 40.

The echo canceller group 40 is made up of a group of echo cancellers for cancelling the echo in each of the bands. For example, the echo canceller of the channel CH1 includes an adaptive digital filter (ADF) $401_1$ for generating a pseudo echo based on a band signal CH1 from the division and decimation process part 10, and a subtractor $402_1$ for generating a residual signal (residual echo) by subtracting the pseudo echo from a band signal CH1 from the division and decimation process part 20. This residual signal is used for controlling the renewal of tap coefficients of the ADF $401_1$ and is supplied to an interpolation and synthesis process part 30. The echo cancellers of the other channels CH2 through CHN have constructions identical to that of the echo canceller of the channel CH1.

The interpolation and synthesis process part 30 includes an interpolation part 301 and a synthesis filter 302. The interpolation part 301 carries out an interpolation process in which the signals of each of the channels subjected to the 1/N decimation in the decimation parts 102 and 202 are restored into original signals. According to this interpolation process, a zero sample is inserted into each of the decimated signals at a rate of 1 in every N−1 samples. The synthesis filter 302 adds the interpolated band signals and generates original transmission signals which are transmitted to the line.

FIG. 2A shows a filter characteristic of the filter banks 101 and 201 of the respective division and decimation process parts 10 and 20. As shown in FIG. 2A, the input signal is divided into N band signals of the channels CH1 through CHN by the filter bank 101 or 201 which is made up of complex filters. In FIG. 2A and FIGS. 2B through 2E which will be described later, fs denotes a sampling frequency.

Each band signal is subjected to the decimation in the decimation part 102 or 202. In this case, the filter characteristic after the decimation for the odd channels CH1, CH3, CH5, ... becomes as shown in FIG. 2B, while the filter characteristic after the decimation for the even channels CH2, CH4, CH6, ... becomes as shown in FIG. 2C.

FIG. 2D shows a signal which is obtained by taking a real part after the band signals of the odd channels pass through the division and decimation process part 10 or 20. Similarly, FIG. 2E shows a signal which is obtained by taking a real part after the band signals of the even channels pass through the division and decimation process part 10 or 20. These signals shown in FIGS. 2D and 2E include aliasing components. In FIGS. 2D and 2E, an arrow pointing right indicates the upper side band of the signal while an arrow pointing left indicates the lower side band of the signal, and the lower side band appears as the aliasing component. The real part signal shown in FIGS. 2D and 2E are used as output signals of the decimation parts 102 and 202, and the echo canceller group 40 operates responsive to the real part signals.

In each of the odd and even channels, the information quantity of each channel is reduced to 1/N by the 1/N decimation. For this reason, the echo canceller which is provided in a stage subsequent to the decimation part can reduce the number of tap coefficients.

A description will now be given of an operation of the conventional echo canceller shown in FIG. 2. A reception signal from the line is input to the division and decimation process part 10 wherein the reception signal is divided into N band signals CH1 through CHN and decimated. The output signals of the division and decimation process part 10 are input to the echo canceller group 40 wherein a pseudo echo of the echo which is mixed to a transmission signal due to the output of the speaker 8 picked up by the microphone 9 is generated in each of the ADFs $401_1$ through $401_n$. The pseudo echo is subtracted from the corresponding band signal of the transmission signal which is processed in the division and decimation process part 20 in one of the subtractors $402_1$ through $402_n$, and the residual signal of each channel is output from the echo canceller group 40.

Each residual signal is interpolated in the interpolation part 301 of the interpolation and synthesis process part 30 in the corresponding one of the channels CH1 through CHN. The interpolated residual signals of the channels CH1 through CHN output from the interpolation part 301 are added in the synthesis filter 302 of the interpolation and synthesis process part 30 and restored to the original residual signal having all of the frequency bands. The output signal of the synthesis filter 302 is supplied to the line.

When compared to the FIR type echo canceller having the direct form, the signal processing quantity of the conventional sub-band acoustic echo canceller described above is approximately 1/N because the sampling rate of the signal after the decimation is 1/N that of the FIR type echo canceller preserving the total number of ADF taps same as the FIR type echo canceller. As a result, it is possible to reduce the scale of the hardware according to the conventional sub-band acoustic echo canceller.

In the conventional sub-band acoustic echo canceller, the echo cancelling process in the echo canceller group 40 is carried out with respect to the real part components of the signals output from the division and decimation process parts 10 and 20. As may be seen from FIGS. 2D and 2E, the real part components have overlapping parts between the band signals due to the aliasing component. When this overlapping part is generated, it is impossible to sufficiently suppress the error between the bands of the residual signal after the synthesis in the interpolation and synthesis process part 30. As a result, there is a problem in that the echo suppression quantity as a whole becomes small.

FIG. 3 shows a spectrum of the residual signal obtained in the conventional sub-band acoustic echo canceller for explaining the effects of the error between the bands. In FIG. 3, the abscissa indicates the frequency and the ordinate indicates the signal level. A solid line I indicates the spectrum characteristic of the residual signal and a dotted line II indicates the spectrum characteristic of the transmission signal when no echo cancellation is carried out. As may be seen from FIG. 3, the error suppression characteristic deteriorates at the boundary of the bands due to the overlapping part between the band signals.

For example, this problem is discussed in Andre Gillorie, "Experiments with Sub-Band Acoustic Echo Cancellers for Teleconferencing", ICASSP '87, 49.12.1, pp. 2141–2144.

On the other hand, the interpolation and synthesis process part 30 carries out the interpolation and synthesis with respect to the residual echo of each band output from the echo canceller group 40, but the residual echo is sufficiently small when the echo canceller is operating normally. For this reason, if the interpolation and synthesis process part 30 is designed to make a fixed-point operation, it becomes impossible to obtain a sufficient dynamic range with respect to the residual echo and there is a problem in that the echo suppression characteristic deteriorates due to the effects of the operation accuracy.

In addition, in the conventional sub-band acoustic echo canceller, the transmission signal input from the microphone 9 is transmitted to the line via the division and decimation process part 20, the echo canceller group 40 and the interpolation and synthesis process part 30. Consequently, the following problem is generated.

That is, the order of the filter banks used in the division and decimation process part 20 and the interpolation and synthesis process part 30 is finite. As a result, a ripple is introduced to the signal at the filter bank and a spectrum of the transmission signal after the synthesis becomes distorted.

SUMMARY OF THE INVENTION

Accordingly, it is a general object of the present invention to provide a novel and useful echo canceller in which the problems described above are eliminated.

Another and more specific object of the present invention is to provide a sub-band acoustic echo canceller comprising first division and decimation process means for dividing a reception signal from a line into first band signals of N channels and for decimating each of the first band signals to output decimated first band signals in a form of complex signals, where N is an integer greater than or equal to two, second division and decimation process means for dividing a transmission signal into second band signals of N channels and for decimating each of the second band signals to output decimated second band signals in a form of complex signals, an echo canceller group made up of a group of echo cancellers for generating a pseudo echo in each band based on a corresponding one of the decimated first band signals received from the first division and decimation process means by referring to a corresponding one of the decimated second band signals received from the second division and decimation process means and for outputting a residual signal in each band by subtracting the pseudo echo of one band from the decimated second band signal of the same band, and interpolation and synthesis process means for subjecting the residual signals received from the echo canceller group to interpolation and synthesis to output a synthesized residual signal which is transmitted to a line as the transmission signal, where the echo canceller group carries out an echo cancelling operation for each band in a complex signal region. According to the sub-band acoustic echo canceller of the present invention, it is possible to improve the echo suppression characteristic.

Still another object of the present invention is to provide a sub-band acoustic echo canceller comprising first division and decimation process means for dividing a reception signal from a line into first band signals of N channels and for decimating each of the first band signals to output decimated first band signals, where N is an integer greater than or equal to two, second division and decimation process means for dividing a transmission signal into second band signals of N channels and for decimating each of the second band signals to output decimated second band signals, an echo canceller group made up of a group of echo cancellers for generating a pseudo echo in each band based on a corresponding one of the decimated first band signals received from the first division and decimation process means by referring to a corresponding one of the decimated second band signals received from the second division and decimation process means, interpolation and synthesis process means for subjecting each pseudo echo received from the echo canceller group to interpolation and synthesis to output a synthesized pseudo echo, and subtracting means for subtracting the synthesized pseudo echo received from the interpolation and synthesis process means from the transmission signal to output a residual signal which is transmitted to a line as the transmission signal.

A further object of the present invention is to provide a sub-band acoustic echo canceller comprising first division and decimation process means for dividing a reception signal from a line into first band signals of N channels and for decimating each of the first band signals to output decimated first band signals, where N is an integer greater than or equal to two, second division and decimation process means for dividing a transmission signal into second band signals of N channels and for decimating each of the second band signals to output decimated second band signals, an echo canceller group made up of a group of echo cancellers for generating a pseudo echo in each band based on a corresponding one of the decimated first band signals received from the first division and decimation process means by referring to a corresponding one of the decimated second band signals received from the second division and decimation process means, first interpolation and synthesis process means for subjecting each decimated second band signal received from the second division and decimation process means to interpolation and synthesis to output a synthesized transmission signal, second interpolation and synthesis process means for subjecting each pseudo echo received from the echo canceller group to interpolation and synthesis to output a synthesized pseudo echo, and subtracting means for subtracting the synthesized pseudo echo received from the interpolation and synthesis process means from the synthesized transmission signal received from the first interpolation and synthesis process means to output a residual signal which is transmitted to a line as the transmission signal.

Another object of the present invention is to provide a sub-band acoustic echo canceller comprising first division and decimation process means for dividing a reception signal from a line into first band signals of N channels and for decimating each of the first band signals to output decimated first band signals, where N is an integer greater than or equal to two, second division and decimation process means for dividing a transmission signal into second band signals of N channels and for decimating each of the second band signals to output decimated second band signals, an echo canceller group made up of a group of echo cancellers for generating a pseudo echo in each band based on a corresponding one of the decimated first band signals received from the first division and decimation process means by referring to a corresponding one of the decimated second band signals received from the second division and decimation process means, first interpolation and synthesis process means for subjecting each pseudo echo received from the echo canceller group to interpolation and synthesis to output a synthesized pseudo echo, second interpolation and synthesis process means for subjecting each decimated second band signals received from the second division and decimation process means to interpolation and synthesis to output a synthesized transmission signal, delay means for delaying the transmission signal from the line, selection means for selectively outputting one of output signals of the second interpolation and synthesis process means and the delay means responsive to a detection signal, subtracting means for obtaining a residual signal by subtracting the synthesized pseudo echo received from the first interpolation and synthesis process means from an output signal received from the selection means, and detection means for outputting the detection signal when a doubletalk is detected, the doubletalk being a state in which only the transmission signal exists or both the transmission signal and the reception signal exist simultaneously, where the echo canceller group carries out an echo cancelling operation for each band in a complex signal region, and the selection means selectively outputs the synthesized transmission signal received from the second interpolation and synthesis process means when no detection signal is received from the detection means and selectively outputting a delayed transmission signal received from the delay means when the detection signal is received from the detection means. According to the sub-band acoustic echo canceller of the present invention, it is possible to reduce the distortion of the transmission signal while minimizing the order of the filter used, and also obtain a satisfactory echo suppression quantity.

Other objects and further features of the present invention will be apparent from the following detailed description when read in conjunction with the accompanying drawings.

BRIEF DESCRIPTION OF THE DRAWINGS

FIGS. 2A through 2E show spectrums of signals for explaining filter characteristics of the conventional sub-band acoustic echo canceller shown in FIG. 1;

FIG. 4 is a system block diagram for explaining an operating principle of a first embodiment of a sub-band acoustic echo canceller according to the present invention;

DESCRIPTION OF THE PREFERRED EMBODIMENTS

Figure 1:
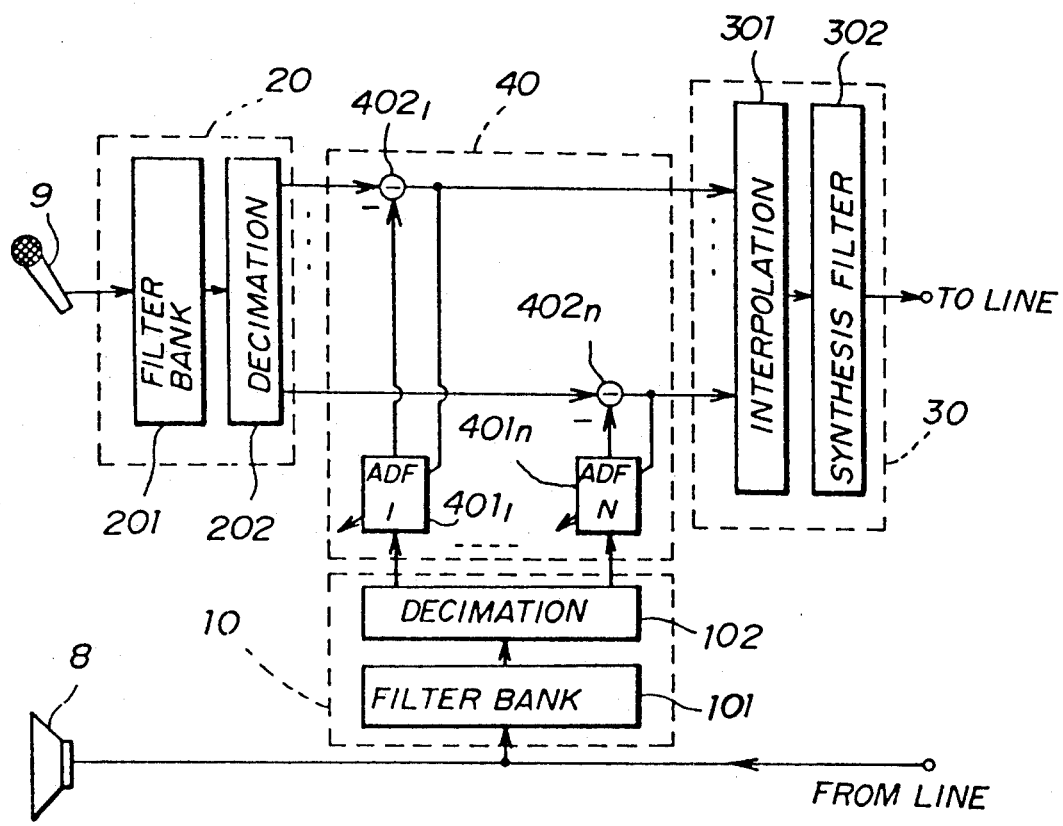
FIG. 1 is a system block diagram showing an example of a conventional sub-band acoustic echo canceller.
Figure 3:
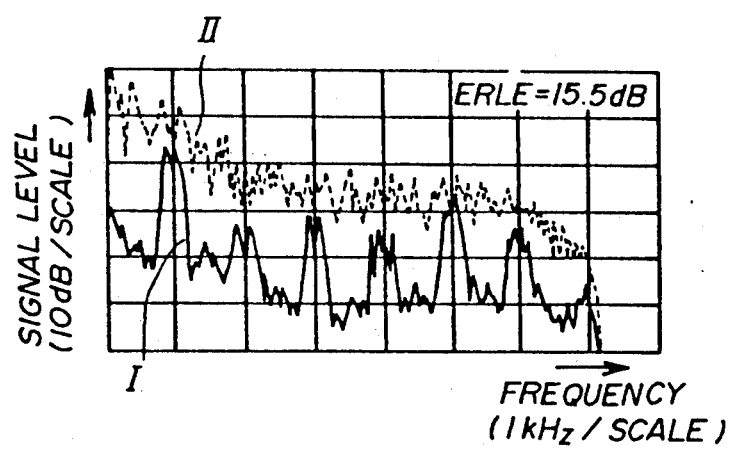
FIG. 3 shows a spectrum of residual echo in the conventional sub-band acoustic echo canceller shown in FIG. 1.

First, a description will be given of an operating principle of a first embodiment of a sub-band acoustic echo canceller according to the present invention by referring to FIG. 4. The sub-band acoustic echo canceller shown in FIG. 4 generally includes first and second division and decimation process parts 91 and 92, an echo canceller group 93 and an interpolation and synthesis process part 94.

The first division and decimation process part 91 divides a reception signal from a line into N channels and subjects N band signals to a decimation to output complex signals, where N is an integer greater than or equal to two. The second division and decimation process part 92 divides a transmission signal into N channels and subjects N band signals to a decimation to output complex signals. The echo canceller group 93 generates a pseudo echo in each band based on the band signals from the first division and decimation process part 91 by referring to the band signals from the second division and decimation process part 92. In addition, the echo canceller group 93 subtracts the pseudo echo of each channel from a corresponding one of the band signals from the second division and decimation process part 92 to output residual signals in each of the bands. The interpolation and synthesis process part 94 subjects the residual signals from the echo canceller group 93 to interpolation and synthesis to output a restored residual signal. The echo cancelling process in each band is carried out in the complex signal region.

In this embodiment, the band signals output from the first and second division and decimation process parts 91 and 92 are complex signals. Hence, the echo cancelling process of the echo canceller group 93 is carried out in each band in the complex signal region. Accordingly, when carrying out the process in the echo canceller group 93, the band signals do not overlap at the boundary of the bands as was the case of the real part components in the conventional sub-band acoustic echo canceller. Therefore, it is possible to prevent the deterioration of the error suppression characteristic at the boundary of the bands conventionally caused by the overlap of the band signals.

For example, the first and second division and decimation process parts 91 and 92 may respectively be formed by a group of N polyphase filters and an N-point inverse discrete Fourier transform circuit while the interpolation and synthesis process part 90 is formed by an N-point inverse discrete Fourier transform circuit and a group of N polyphase filters, so as to carry out a 2/N decimation. Alternatively, the first and second division and decimation process parts 91 and 92 may respectively be formed by a group of 2N polyphase filters and a 2N-point inverse discrete Fourier transform circuit while the interpolation and synthesis process part 90 is formed by a 2N-point inverse discrete Fourier transform circuit and a group of 2N polyphase filters, so as to carry out a 1/N decimation. In either case, the signal processing quantity can be reduced compared to that of the conventional sub-band acoustic echo canceller.

In addition, a doubletalk detection control may be carried out using one of the channels after the decimation process. In this case, it is possible to simplify the circuit for carrying out the doubletalk detection control and reduce the scale of the hardware.

Figure 5:
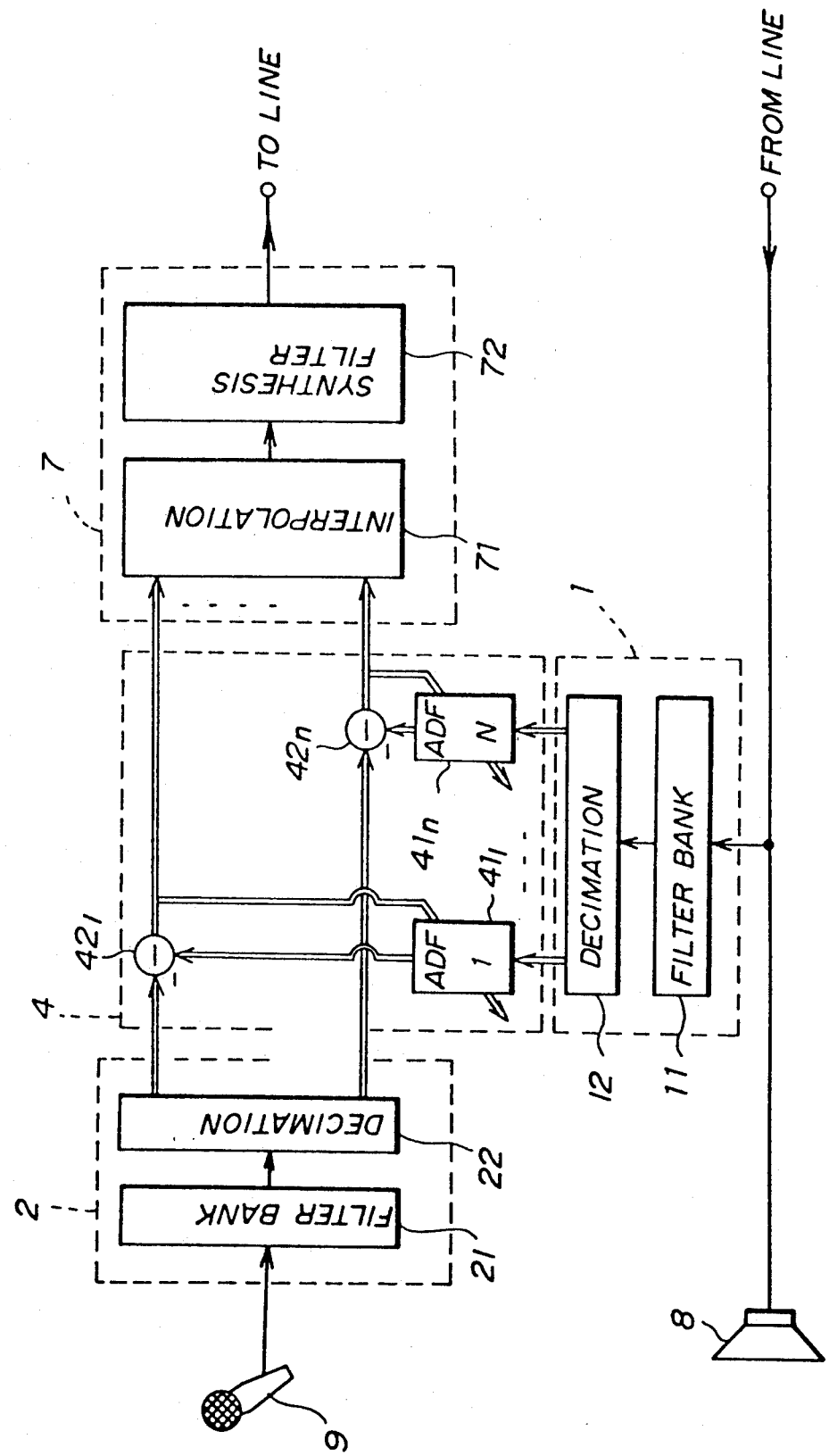
FIG. 5 is a system block diagram showing the first embodiment of the sub-band acoustic echo canceller.

Next, a more detailed description will be given of the first embodiment of the sub-band acoustic echo canceller according to the present invention by referring to FIG. 5. In FIG. 5, division and decimation process parts 1 and 2 respectively correspond to the first and second division and decimation process parts 91 and 92 shown in FIG. 4, an echo canceller group 4 corresponds to the echo canceller group 93 shown in FIG. 4, and an interpolation and synthesis process part 7 corresponds to the interpolation and synthesis process part 94 shown in FIG. 4.

In FIG. 5, the reception signal from the line is input to the speaker 8 and to the division and decimation process part 1. In addition, the transmission signal from the microphone 9 is supplied to the line via the division and decimation process part 2, the echo canceller group 4 and the interpolation and synthesis process part 7.

The division and decimation process part 1 is made up of an N-channel division filter bank 11 and a decimation part 12. The division and decimation process part 1 divides the reception signal into band signals of N channel in the filter bank 11, and subjects each band signal to a 2/N decimation in the decimation part 12 so as to decimate the sampling points to 2/N. The decimation part 12 outputs signals in the form of complex signals, and not in the form of the real part component only as was the case of the conventional sub-band acoustic echo canceller.

Similarly, the division and decimation process part 2 is made up of an N-channel division filter 21 and a decimation part 22, and the decimation part 21 outputs signals in the form of complex signals. The division and decimation process parts 1 and 2 are respectively a double oversampling type.

Similarly to the echo canceller group 40 of the conventional sub-band acoustic echo canceller, the echo canceller group 4 has the functions of generating a pseudo echo for each channel based on a corresponding one of the band signals received from the division and decimation process part 1 using each of ADFs $41_1$ through $41_n$, and obtaining a residual signal for each channel by subtracting the pseudo echo from a corresponding one of the band signals received from the division and decimation process part 2 using each of subtractors $42_1$ through $42_n$. However, the echo canceller group 4 differs from the conventional echo canceller group 40 in that the echo canceller group 4 operates in the complex signal region. Any algorithm in the complex region applicable to the echo canceller having the direct form may be used as the adaptive control algorithm of the echo canceller group 4. For example, it is possible to use the normalized complex least means square (LMS) algorithm.

The interpolation and synthesis process part 7 includes an interpolation part 71 for interpolating the residual signal of each channel output from the echo canceller group 4, and a synthesis filter 72 for thereafter synthesizing the interpolated residual signals. The interpolation and synthesis process part 7 is also designed to process complex signals.

Figure 6A:
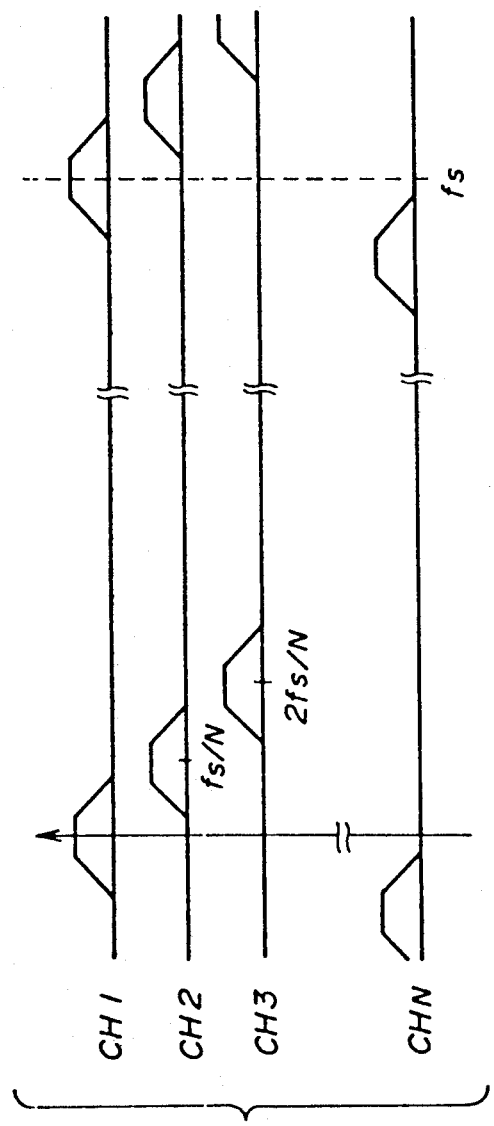
FIGS. 6A through 6C show spectrums of a filter bank and a decimation part of a division and decimation process part shown in FIG. 5 for a case where a 2/N decimation process is carried out.
Figure 6B:
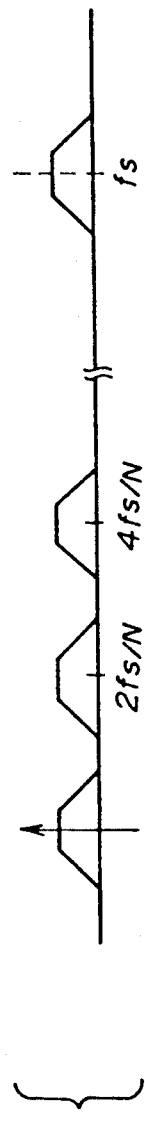
Figure 6C:
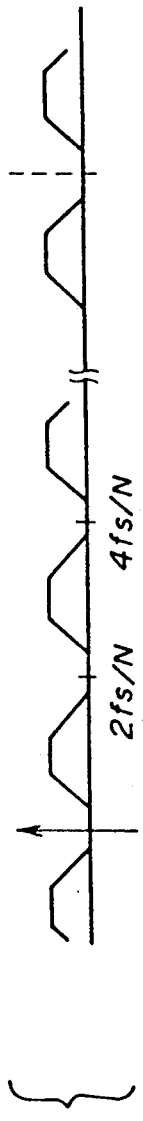

FIGS. 6A through 6C show spectrums of the filter bank 11 (or 12) and the decimation part 12 (or 22) of the division and decimation process part 1 (or 2) for a case where a 2/N decimation process is carried out. FIG. 6A shows a channel division characteristic of a band division complex filter group. FIG. 6B shows the filter characteristic for the odd channels CH1, CH3, CH5, ... after the decimation, and FIG. 6C shows the filter characteristic for the even channels CH2, CH4, CH6, ... after the decimation.

When a filter characteristic corresponding to the channel CH1 is denoted by H(Z) and $Z = \exp(j2\pi f/fs)$, the following formula (1) can be obtained by identity decomposition.

$$H(Z) = \sum_{i=0}^{N-1} Z^{-i} H_i(Z^N) \quad (1)$$

A filter characteristic $H^L(Z)$ corresponding to a channel CHL (L=2, ..., N) can be obtained from the following formula (2) by replacing f in formula (1) by $f-(L-1)fs/N$.

$$H^L(Z) = \sum_{i=0}^{N-1} \exp[j2\pi(L-1)i/N] Z^{-i} H_i(Z^N) \quad (2)$$

When an input signal X(Z) to the filter bank 11 (or 21) is described by the following formula (3), an output $Y_L(Z)$ of the filter corresponding to the channel CHL can be described by the following formula (4).

$$X(Z) = \sum_{m=0}^{N/2-1} Z^{-m} X_m(Z^{N/2}) + \quad (3)$$

$$Z^{-N/2} \sum_{m=0}^{N/2-1} Z^{-m} X_{N/2+m}(Z^{N/2})$$

$$Y_L(Z) = \sum_{i=0}^{N-1} \exp[j2\pi(L-1)i/N] \quad (4)$$

$$\left[ \sum_{m=0}^{N/2-1} Z^{-m} Z^{-i} X_m(Z^{N/2}) H_i(Z^N) + \right.$$

$$\left. Z^{-N/2} \sum_{m=0}^{N/2-1} Z^{-m} Z^{-i} X_{N/2+m}(Z^{N/2}) H_i(Z^N) \right]$$

Figure 7:
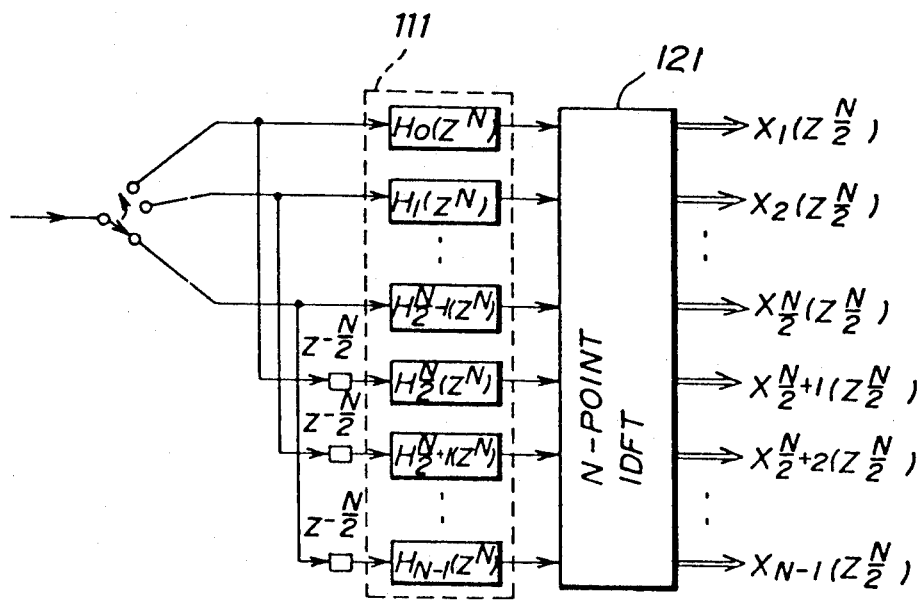
FIG. 7 is a system block diagram showing an embodiment of the division and decimation process part for the case where, the 2/N decimation process is carried out.

When carrying out the decimation process with respect to this output $Y_L(Z)$, m+i should be constant, and FIG. 7 shows an embodiment of the division and decimation part 1 (or 2) for carrying out the division and decimation based on the formula (4).

In FIG. 7, the division and decimation process part 1 (or 2) includes a polyphase filter group 111 made up of N polyphase filters respectively having transfer characteristics $H_0(Z^N)$ through $H_{N-1}(Z^N)$, and an N-point inverse discrete Fourier transform (IDFT) circuit 121 which receives outputs of the polyphase filter group 111.

Figure 8:
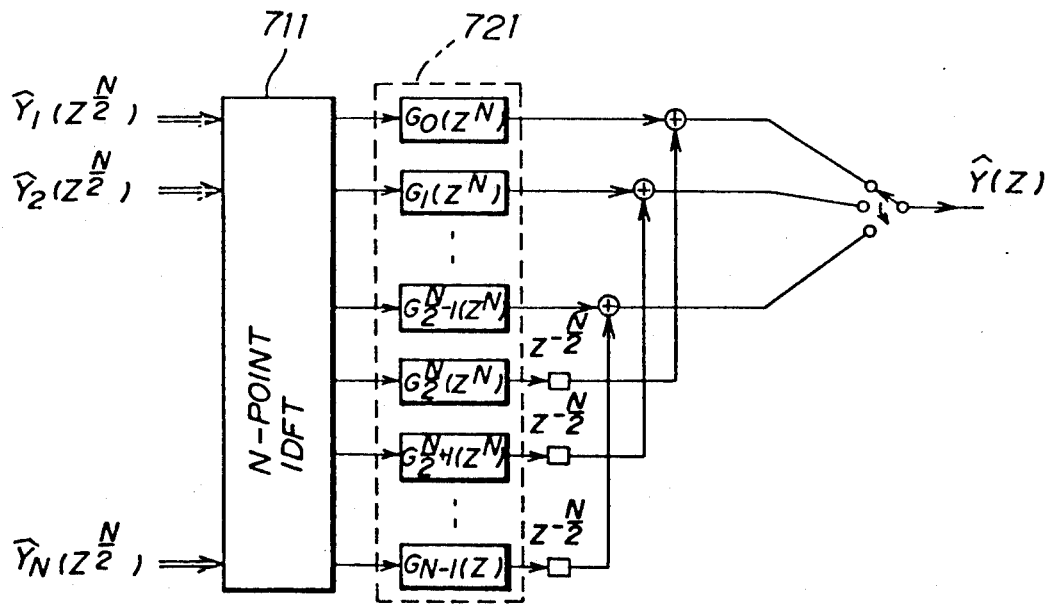
FIG. 8 is a system block diagram showing an embodiment of an interpolation and synthesis process part for the case where the 2/N decimation process is carried out.

Similarly, the interpolation part 71 and the synthesis filter 72 of the interpolation and synthesis process part 7 may be constructed as shown in FIG. 8 when the 2/N decimation process is carried out. In FIG. 8, the interpolation part 71 is made up of an N-point IDFT circuit 711, and the synthesis filter 72 is made up of a polyphase filter group 721 made up of N polyphase filters respectively having transfer characteristics $G_0(Z^N)$ through $G_{N-1}(Z^N)$.

FIGS. 7 and 8 respectively show embodiments of the division and decimation process part 1 (or 2) and the interpolation and synthesis process part 7 for the case where the 2/N decimation process is carried out. However, the division and decimation process part 1 (or 2) and the interpolation and synthesis process part 7 respectively are not limited to the embodiments shown in FIGS. 7 and 8. For example, when carrying out a 1/N decimation process, the division and decimation process part 1 (or 2) and the interpolation and synthesis process part 7 may respectively have the constructions shown in FIGS. 10 and 11 which will be described later.

Figure 9A:
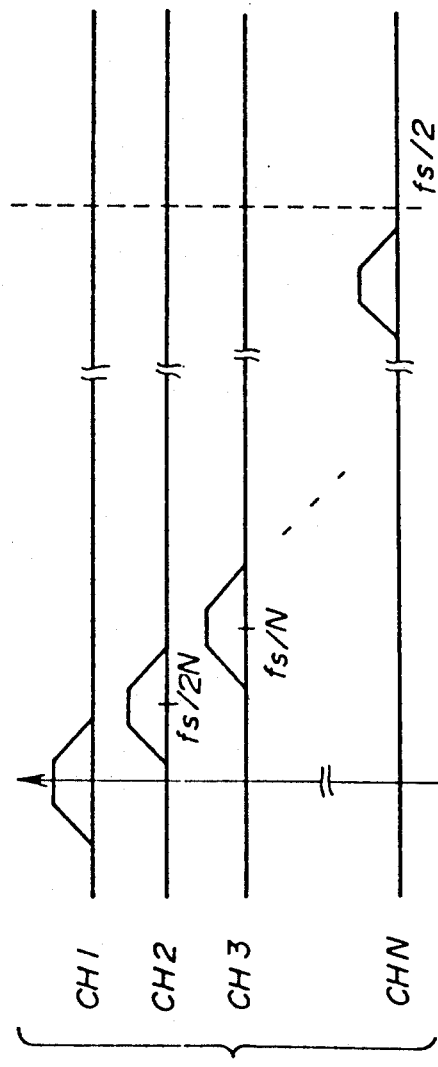
FIGS. 9A through 9C show spectrums of the filter bank and the decimation part of the division and decimation process part shown in FIG. 5 for a case where a 1/N decimation process is carried out.
Figure 9B:
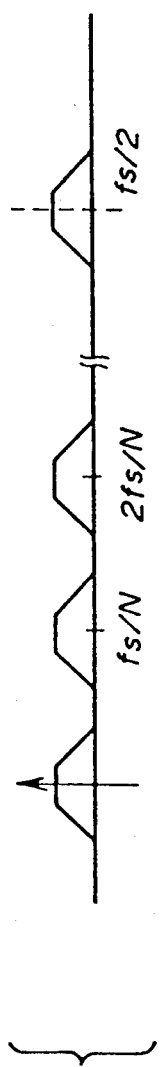
Figure 9C:
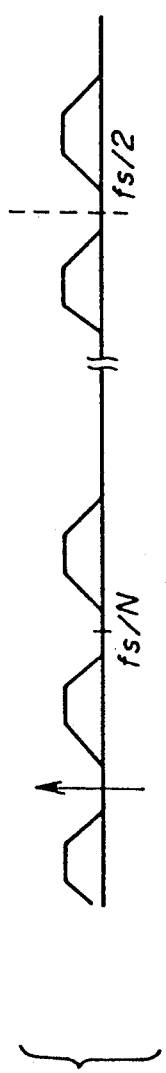

FIGS. 9A through 9C show spectrums of the filter bank 11 (or 12) and the decimation part 12 (or 22) of the division and decimation process part 1 (or 2) for a case where the 1/N decimation process is carried out. FIG. 9A shows a channel division characteristic of a band division complex filter group. FIG. 9B shows the filter characteristic for the odd channels CH1, CH3, CH5, ... after the decimation, and FIG. 9C shows the filter characteristic for the even channels CH2, CH4, CH6, ... after the decimation.

When a filter characteristic corresponding to the channel CH1 is denoted by H(Z) and $Z = \exp(j2\pi f/fs)$, the following formula (5) can be obtained by identity decomposition.

$$H(Z) = \sum_{i=0}^{2N-1} Z^{-i} H_i(Z^{2N}) \quad (5)$$

A filter characteristic $H_L(Z)$ corresponding to a channel CHL (L=2, ..., N) can be obtained from the following formula (6) by replacing f in formula (5) by $f-(L-1)fs/2N$.

$$H^L(Z) = \sum_{i=0}^{2N-1} \exp[j2\pi(L-1)i/2N] Z^{-i} H_i(Z^{2N}) \quad (6)$$

When an input signal X(Z) to the filter bank 11 (or 21) is described by the following formula (7), an output $Y_L(Z)$ of the filter corresponding to the channel CHL can be described by the following formula (8).

$$X(Z) = \sum_{m=0}^{N-1} Z^{-m} X_m(Z^{2N}) + Z^{-N} \quad (7)$$

$$\sum_{m=0}^{N-1} Z^{-m} X_{N+m}(Z^{2N})$$

-continued $$Y_L(Z) = \sum_{i=0}^{2N-1} \exp[j2\pi(L-1)i/2N]$$

$$\left[\sum_{m=0}^{N-1} Z^{-m}Z^{-i}X_m(Z^{2N})H_i(Z^{2N}) + Z^{-N}\sum_{m=0}^{N-1} Z^{-m}Z^{-i}X_{N+m}(Z^{2N})H_i(Z^{2N})\right]$$ (8)

Figure 10:
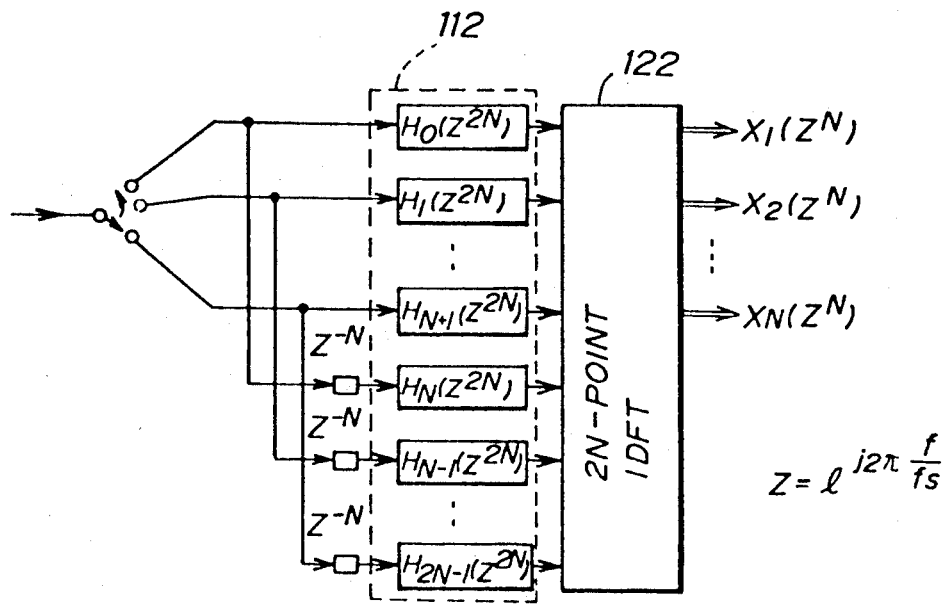
FIG. 10 is a system block diagram showing an embodiment of the division and decimation process part for the case where the 1/N decimation process is carried out.

When carrying out the decimation process with respect to this output $Y_L(Z)$, $m+i$ should be constant, and FIG. 10 shows an embodiment of the division and decimation part 1 (or 2) for carrying out the division and decimation based on the formula (8).

In FIG. 10, the division and decimation process part 1 (or 2) includes a polyphase filter group 112 made up of 2N polyphase filters respectively having transfer characteristics $H_0(Z^{2N})$ through $H_{2N-1}(Z^{2N})$, and an N-point IDFT circuit 122 which receives outputs of the polyphase filter group 112.

Figure 11:
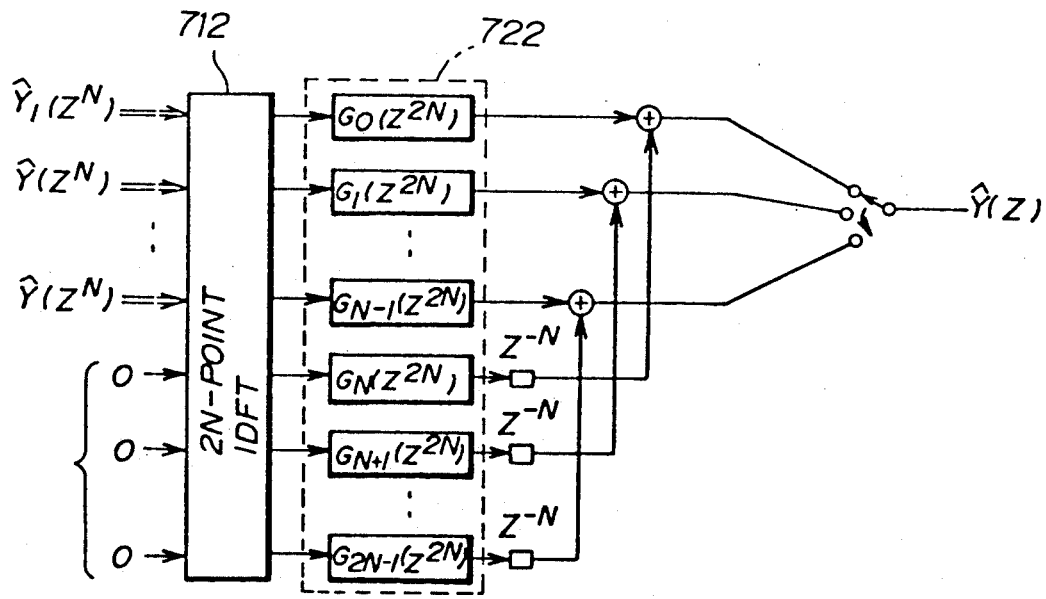
FIG. 11 is a system block diagram showing an embodiment of an interpolation and synthesis process part for the case where the 1/N decimation process is carried out.

Similarly, the interpolation part 71 and the synthesis filter 72 of the interpolation and synthesis process part 7 may be constructed as shown in FIG. 11 when the 1/N decimation process is carried out. In FIG. 11, the interpolation part 71 is made up of an N-point IDFT circuit 712, and the synthesis filter 72 is made up of a polyphase filter group 722 made up of 2N polyphase filters respectively having transfer characteristics $G_0(Z^{2N})$ through $G_{2N-1}(Z^{2N})$.

The basic operation of this first embodiment of the sub-band acoustic echo canceller is similar to that of the conventional sub-band acoustic echo canceller shown in FIG. 1. However, the signal processing in the division and decimation process parts 1 and 2, the echo canceller group 4, and the interpolation and synthesis process part 7 is carried out in the complex signal region. As may be seen from the filter characteristics of FIGS. 6B and 6C (or 9B and 9C), there is no overlap of spectrums between the band signals. As a result, this embodiment can eliminate the deterioration of the echo suppression characteristic generated at the boundary of the bands in the conventional sub-band acoustic echo canceller.

Next, a description will be given of an operating principle of a second embodiment of the sub-band acoustic echo canceller according to the present invention, by referring to FIG. 12. The sub-band acoustic echo canceller shown in FIG. 12 generally includes a delay part 205, first and second division and decimation process parts 95 and 96, an echo canceller part 97, an interpolation and synthesis process part 98, and a subtracting part 99.

The first division and decimation process part 95 divides a reception signal from a line into N channels and subjects N band signals to a decimation, where N is an integer greater than or equal to two. The second division and decimation process part 96 divides a transmission signal into N channels and subjects N band signals to a decimation. The echo canceller group 97 generates a pseudo echo in each band based on the band signals from the first division and decimation process part 95 by referring to the band signals from the second division and decimation process part 96. The interpolation and synthesis process part 98 subjects the pseudo echo of each band received from the echo canceller group 97 to interpolation and synthesis to output a pseudo echo. The subtracting part 99 subtracts the output pseudo echo of the interpolation and synthesis process part 98 from the delayed transmission signal from the delay part 205 to output a residual signal.

In this embodiment, the echo canceller group 97 is not provided in the path through which the transmission signal is transmitted to the line, and the pseudo echo is subtracted from the transmission signal which does not pass through the echo canceller group 97. The subtracting part 99 carries out this subtraction and the echo is cancelled before being transmitted to the line. In other words, the second division and decimation process part 96, the echo canceller group 97, and the interpolation and synthesis process part 98 form a path for only generating the pseudo echo. Accordingly, the passband-ripple caused by the second division and decimation process part 96 and the interpolation and synthesis process part 98 does not effect the frequency characteristic of the transmission signal.

The signal which is subjected to the interpolation and synthesis in the interpolation and synthesis process part 98 is not the residual signal but the pseudo echo. Because the signal level of the pseudo echo is normally large, it is possible to obtain a sufficiently large dynamic range with respect to the input signal even when the interpolation and synthesis process part 98 is formed by a fixed-point operation circuit, and it is possible to reduce the deterioration of the echo suppression characteristic caused by the operation accuracy.

If the pseudo echo generation for each band is carried out within the echo canceller group 97 in the complex signal region, it is possible to prevent the deterioration of the echo suppression characteristic at the boundary of the bands because there is no overlap of the signal components between the band signals.

For example, the first and second division and decimation process parts 95 and 96 may respectively be formed by a group of N polyphase filters and an N-point inverse discrete Fourier transform circuit while the interpolation and synthesis process part 98 is formed by an N-point inverse discrete Fourier transform circuit and a group of N polyphase filters, so as to carry out a 2/N decimation. Alternatively, the first and second division and decimation process parts 95 and 96 may respectively be formed by a group of 2N polyphase filters and a 2N-point inverse discrete Fourier transform circuit while the interpolation and synthesis process part 98 is formed by a 2N-point inverse discrete Fourier transform circuit and a group of 2N polyphase filters, so as to carry out a 1/N decimation. In either case, the signal processing quantity can be reduced compared to that of the conventional sub-band acoustic echo canceller.

In addition, a doubletalk detection control may be carried out using one of the channels after the decimation process. In this case, it is possible to simplify the circuit for carrying out the doubletalk detection control and reduce the scale of the hardware.

Next, a more detailed description will be given of the second embodiment of the sub-band acoustic echo canceller according to the present invention by referring to FIG. 13. In FIG. 13, division and decimation process parts 1 and 2 respectively correspond to the first and second division and decimation process parts 95 and 96 shown in FIG. 12, an echo canceller group 4 corresponds to the echo canceller group 97 shown in FIG. 12, a delay part 5 corresponds to the delay part 205 shown in FIG. 12, an interpolation and synthesis process part 7 corresponds to the interpolation and synthesis process part 98 shown in FIG. 12, and a subtractor 6 corresponds to the subtracting part 99 shown in FIG. 12. In FIG. 13, those parts which are the same as those corresponding parts in FIG. 5 are designated by the same reference numerals, and a description thereof will be omitted.

In this embodiment, it is possible to not only prevent the deterioration of the echo suppression characteristic generated at the boundary of the band signals but also prevent the transmission signal from being distorted by the passband-ripple.

In FIG. 13, the reception signal from the line is input to the speaker 8 and the division and decimation process part 1. On the other hand, the transmission signal from the microphone 9 is input to the division and decimation process part 2, and is also input to the subtractor 6 via the delay circuit 5. The delay circuit 5 compensates for a signal propagation delay introduced in the division and decimation process part 2 and the interpolation and synthesis process part 3, and delays the transmission signal from the microphone 9 by the signal delay time which occurs in the division and decimation process part 2 and the interpolation and synthesis process part 3, so that the phase of the signals from the two systems match.

The band signals output from the division and decimation process part 2 are input to the echo canceller group 4, and the pseudo echo of each channel generated in the corresponding echo canceller is output to the interpolation and synthesis process part 3. The interpolation and synthesis process part 3 interpolates the pseudo echo of each channel and thereafter synthesizes the interpolated pseudo echo of each channel to generate a synthesized pseudo echo. This synthesized pseudo echo is supplied to the subtractor 6 which generates the residual signal by subtracting the synthesized pseudo echo from the transmission signal which is received via the delay circuit 5, and the residual signal is transmitted to the line.

The division and decimation process parts 1 and 2 may respectively have the construction shown in FIG. 7 or 10. In addition, the interpolation and synthesis process part 3 may have the construction shown in FIG. 8 or 11.

Next, a more detailed description will be given of the operation of this second embodiment of the sub-band acoustic echo canceller shown in FIG. 13. The division and decimation process part 1 subjects the reception signal from the line to the band division and decimation processes, and each band signal from the division and decimation process part 1 is input to the echo canceller group 4. On the other hand, the transmission signal from the microphone 9 is subjected to the band division and the decimation in the division and decimation process part 2 and input to the echo canceller group 4. The echo canceller group 4 has the functions of generating the pseudo echo for each channel based on a corresponding one of the band signals received from the division and decimation process part 1 using each of ADFs $41_1$ through $41_n$, and obtaining the residual signal for each channel by subtracting the pseudo echo from a corresponding one of the band signals received from the division and decimation process part 2 using each of subtractors $42_1$ through $42_n$. Each of the ADFs $41_1$ through $41_n$ carries out the tap coefficient control using the residual signal.

The pseudo echo of each band generated in the echo canceller group 4 is input to the interpolation and synthesis process part 3 wherein the pseudo echo is subjected to the interpolation process in the interpolation part 31 and the synthesis process in the synthesis filter 32. As a result, a synthesized pseudo echo having all of the bands is generated in the synthesis filter 32 and supplied to the subtractor 6.

The subtractor 6 subtracts the pseudo echo from the transmission signal which is obtained via the delay circuit 5. Hence, it is possible to eliminate the echo which is mixed to the transmission signal caused by the output of the speaker 8 being picked up by the microphone 9. The transmission signal after elimination of the echo is transmitted to the line.

According to this second embodiment, the transmission signal from the microphone is transmitted to the line via the delay circuit 5 and the subtractor 6, and does not pass through the echo canceller group 4. Accordingly, it is possible to prevent the transmission signal from being distorted by the passband-ripple, and the quality of the call is improved.

In addition, the echo suppression characteristic is improved at the boundary of the bands, similarly as in the case of the first embodiment described above.

Furthermore, because the signal which is subjected to the interpolation and synthesis in the interpolation and synthesis process part 3 is the pseudo echo which normally has a large signal level, it is possible to obtain a sufficiently large dynamic range with respect to the input signal even when the interpolation and synthesis process part 4 is formed by a fixed-point operation circuit. Thus, it is possible to reduce the deterioration of the echo suppression characteristic caused by the operation accuracy.

Next, a description will be given of an operating principle of a third embodiment of the sub-band acoustic echo canceller according to the present invention, by referring to FIG. 14. The sub-band acoustic echo canceller shown in FIG. 14 generally includes first and second division and decimation process parts 95 and 96, an echo canceller part 97, first and second interpolation and synthesis process parts 90 and 98, and a subtracting part 99.

Figure 12:
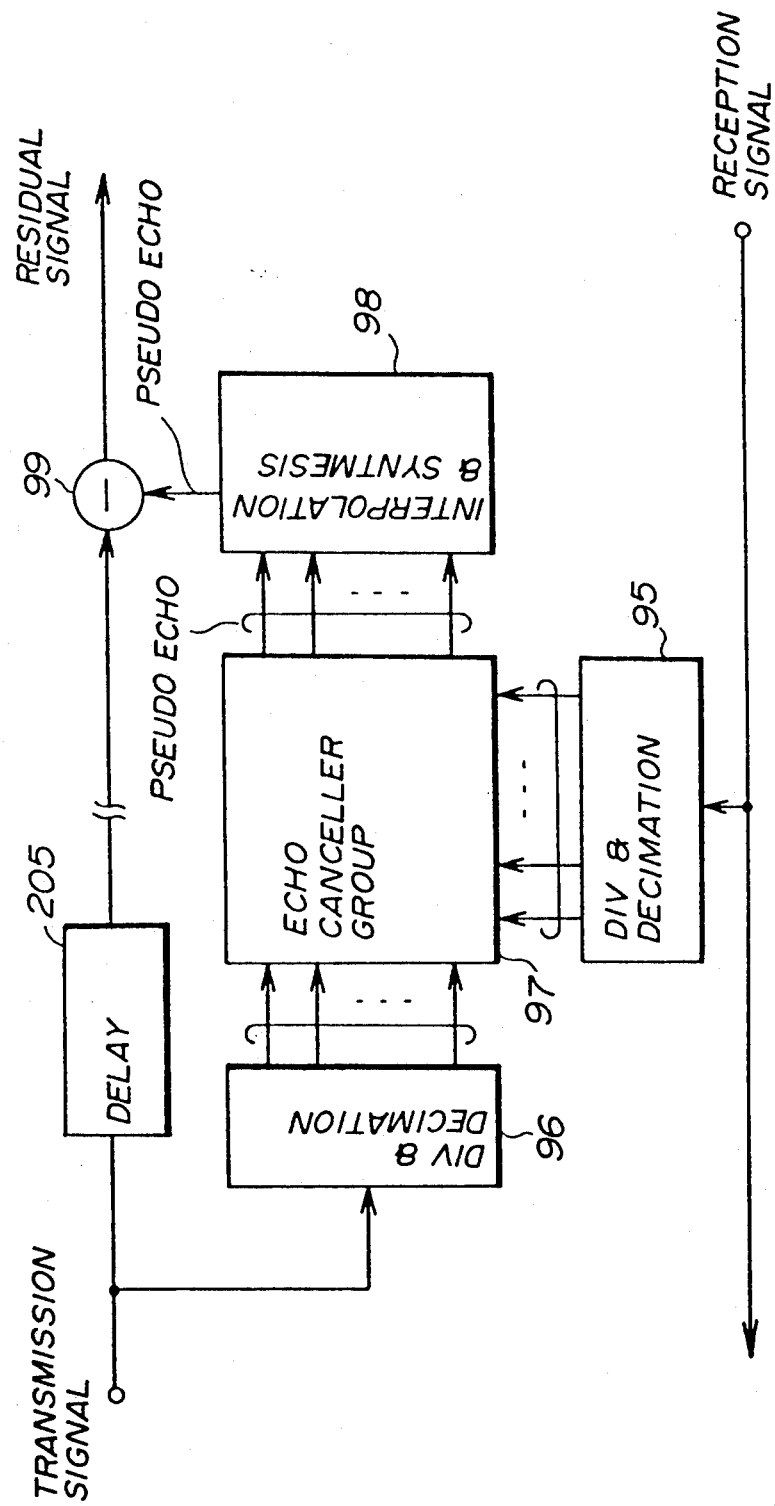
FIG. 12 is a system block diagram for explaining an operating principle of a second embodiment of the sub-band acoustic echo canceller according to the present invention.
Figure 13:
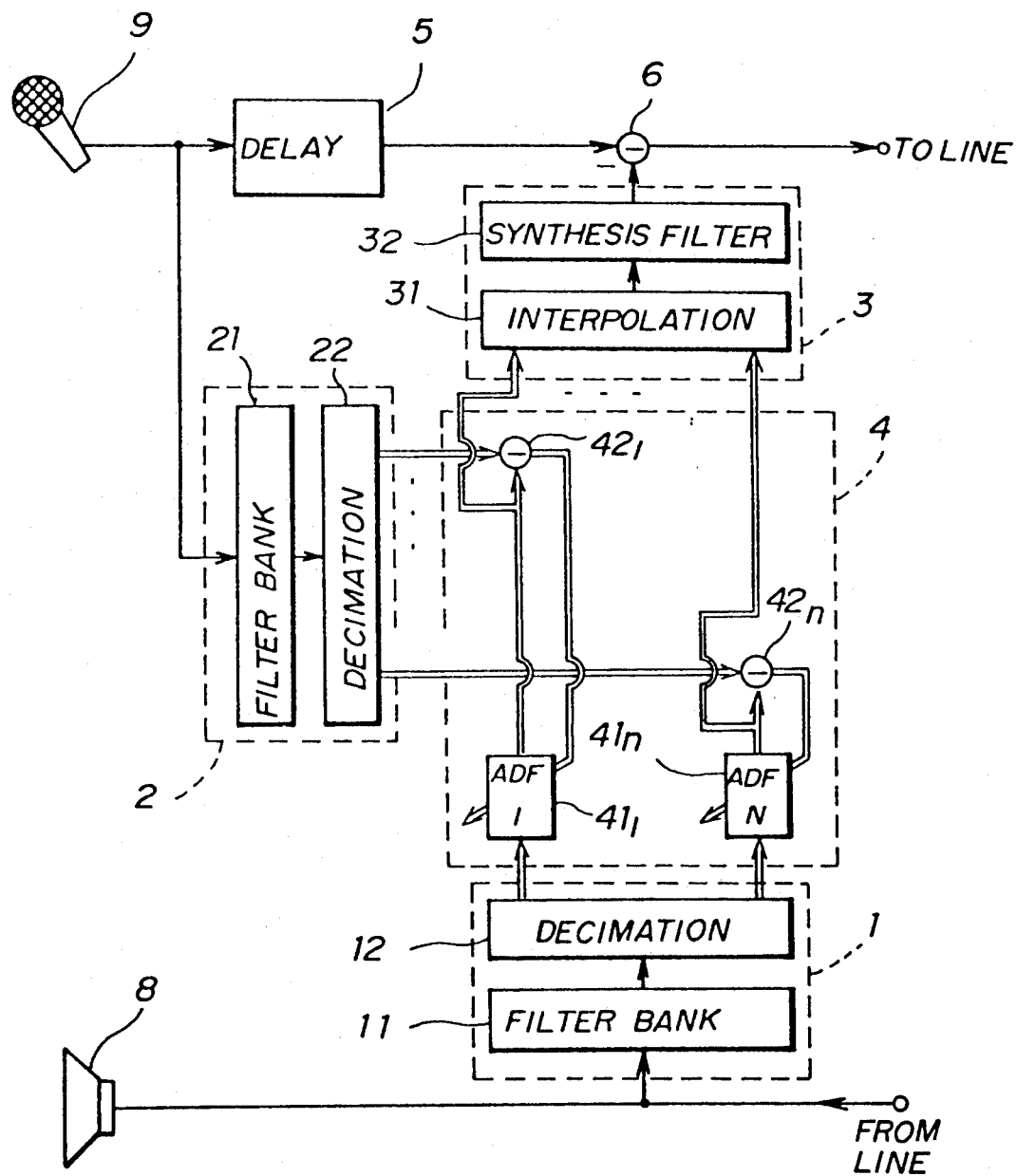
FIG. 13 is a system block diagram showing the second embodiment of, the sub-band acoustic echo canceller.
Figure 14:
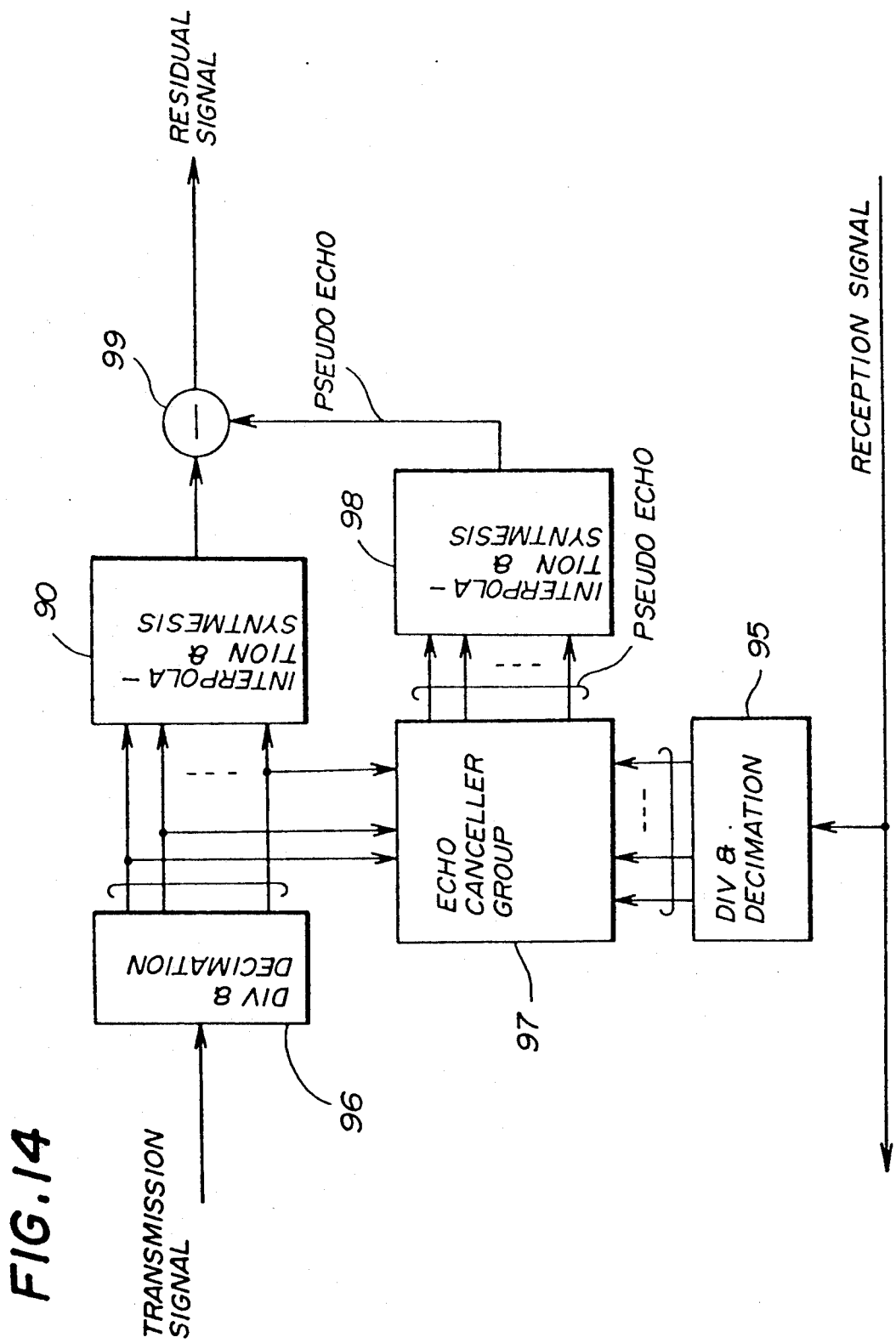
FIG. 14 is a system block diagram for explaining an operating principle of a third embodiment of the sub-band acoustic echo canceller according to the present invention.

In FIG. 14, those parts which are the same as those corresponding parts in FIG. 12 are designated by the same reference numerals, and a description thereof will be omitted. The first interpolation and synthesis process part 90 subjects the band signal of each band received from the second division and decimation process part 96 to interpolation and synthesis to output a synthesized transmission signal. The subtracting part 99 subtracts the output pseudo echo of the second interpolation and synthesis process part 98 from the synthesized transmission signal to output a residual signal.

In this embodiment, the transmission signal which is transmitted to the line is obtained by subjecting each band signal from the second division and decimation process part 96 to the interpolation and synthesis in the first interpolation and synthesis process part 90.

The signals input to the first interpolation and synthesis process part 90 are the transmission signals of each of the bands, while the signals input to the second interpolation and synthesis process part 98 are the pseudo echo signals. The signals input to the first and second interpolation and synthesis process parts 90 and 98 have relatively large signal levels, it is possible to reduce the deterioration of the characteristic dependent on the operation accuracy even if fixed-point operation circuits are used for the first and second interpolation and synthesis process parts 90 and 98.

Furthermore, even when the signal after the synthesis includes a ripple component due to the finite order of the filter used in the first and second division and decimation process parts 95 and 95 and the first and second interpolation and synthesis process parts 90 and 98, this ripple component is cancelled in the final transmission signal because the subtractor 99 subtracts the output signal of the second interpolation and synthesis process part 98 from the output signal of the first interpolation and synthesis process part 90. Therefore, the suppression level of the echo is improved.

If the pseudo echo generation for each band is carried out within the echo canceller group 97 in the complex signal region, it is possible to prevent the deterioration of the echo suppression characteristic at the boundary of the bands because there is no overlap of the signal components between the band signals.

For example, the first and second division and decimation process parts 95 and 96 may respectively be formed by a group of N polyphase filters and an N-point inverse discrete Fourier transform circuit while the interpolation and synthesis process part 98 is formed by an N-point inverse discrete Fourier transform circuit and a group of N polyphase filters, so as to carry out a 2/N decimation. Alternatively, the first and second division and decimation process parts 95 and 96 may respectively be formed by a group of 2N polyphase filters and a 2N-point inverse discrete Fourier transform circuit while the interpolation and synthesis process part 98 is formed by a 2N-point inverse discrete Fourier transform circuit and a group of 2N polyphase filters, so as to carry out a 1/N decimation. In either case, the signal processing quantity can be reduced compared to that of the conventional sub-band acoustic echo canceller.

In addition, a doubletalk detection control may be carried out using one of the channels after the decimation process. In this case, it is possible to simplify the circuit for carrying out the doubletalk detection control and reduce the scale of the hardware.

Figure 15:
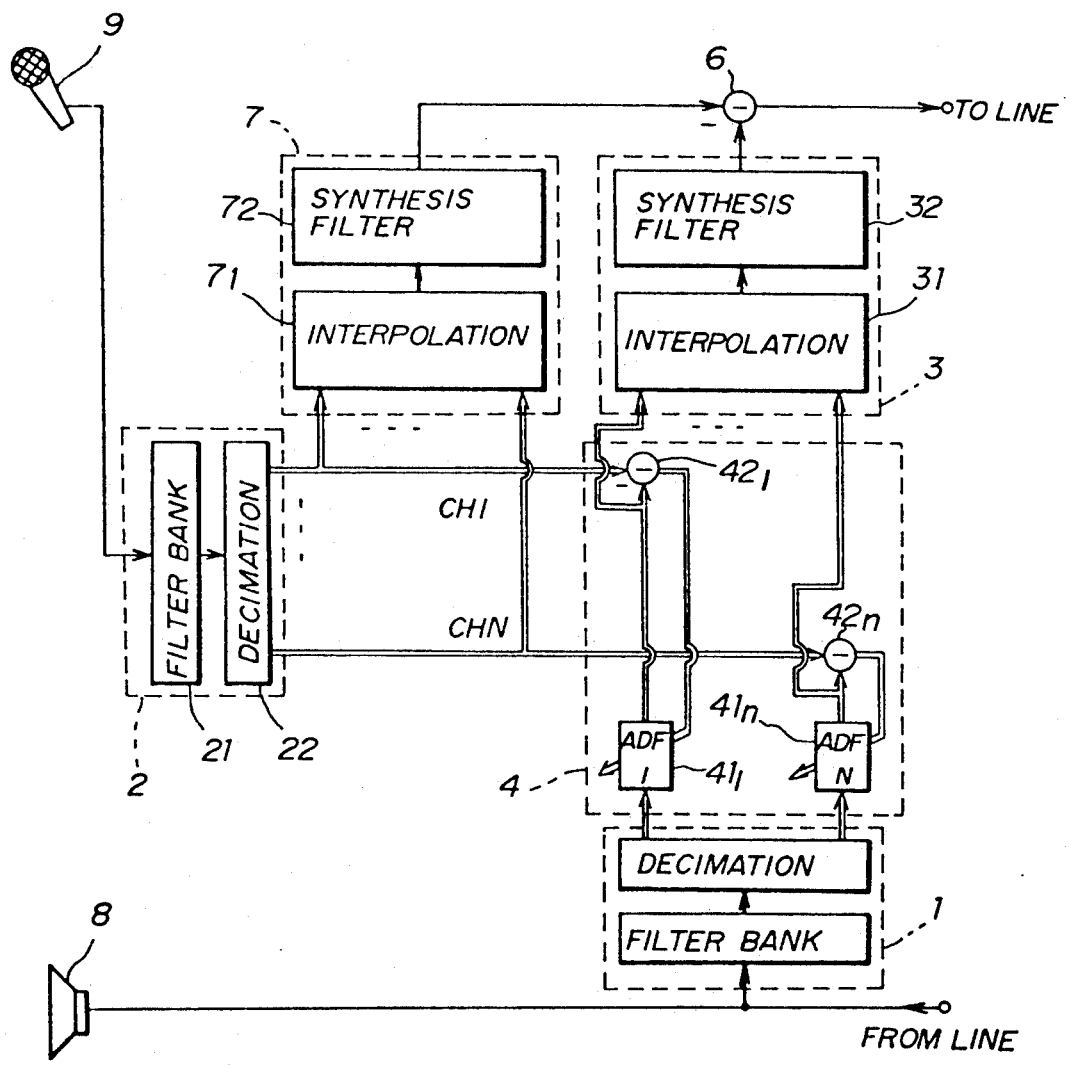
FIG. 15 is a system block diagram showing the third embodiment of the sub-band acoustic echo canceller.

Next, a more detailed description will be given of the third embodiment of the sub-band acoustic echo canceller according to the present invention by referring to FIG. 15. In FIG. 15, division and decimation process parts 1 and 2 respectively correspond to the first and second division and decimation process parts 95 and 96 shown in FIG. 14, an echo canceller group 4 corresponds to the echo canceller group 97 shown in FIG. 14, interpolation and synthesis process parts 7 and 3 respectively correspond to the first and second interpolation and synthesis process parts 90 and 98 shown in FIG. 14, and a subtractor 6 corresponds to the subtracting part 99 shown in FIG. 14. In FIG. 15, those parts which are the same as those corresponding parts in FIG. 13 are designated by the same reference numerals, and a description thereof will be omitted.

In this embodiment, it is possible to not only prevent the deterioration of the echo suppression characteristic generated at the boundary of the band signals and eliminate the noise which mixes into the transmission signal in the echo canceller group, but also suppress the ripple component which mixes into the transmission signal in the decimation process filter.

This third embodiment differs from the second embodiment in that each band signal from the division and decimation process part 2 is supplied to both the echo canceller group 4 and the interpolation and synthesis process part 7, and the original transmission signal is restored by the interpolation and synthesis processes carried out on each band signal in the interpolation and synthesis process part 7 so that this restored transmission signal is input to the subtractor 6. Hence, the signal path from the microphone 9 to the subtractor 6 via the delay circuit 5 of the second embodiment is omitted in this third embodiment.

The operation of this third embodiment is basically the same as that of the second embodiment, but in the third embodiment, the transmission signal from which the synthesized pseudo echo signal is subtracted in the subtractor 6 is the synthesized transmission signal which is received from the interpolation and synthesis process part 7.

According to this third embodiment, even when the signal after the synthesis includes a ripple component due to the finite order of the filter used in the division and decimation process parts 1 and 2 and the interpolation and synthesis process parts 7 and 3, this ripple component is cancelled in the final transmission signal because the subtractor 6 subtracts the output signal of the interpolation and synthesis process part 3 from the output signal of the interpolation and synthesis process part 7, thereby mutually cancelling the ripple components from the two systems. Therefore, it is possible to suppress the deterioration of the echo suppression characteristic.

In addition, the signal delay which is introduced in the interpolation and synthesis process part 3 is adjusted by the signal delay which is introduced in the interpolation and synthesis process part 7, and the phases of the signals from the two systems match at the subtractor 6.

Figure 16:
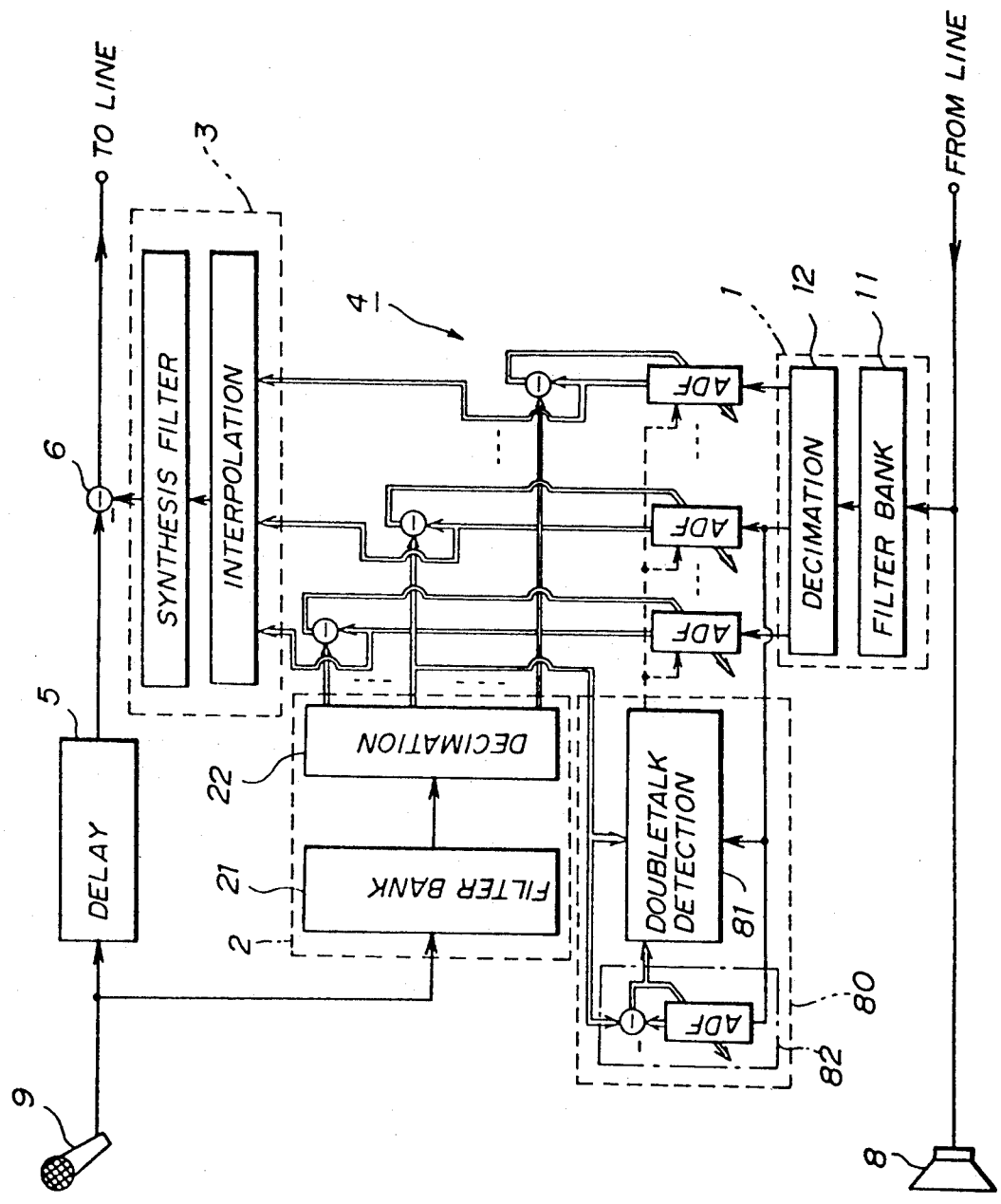
FIG. 16 is a system block diagram showing a modification of the second embodiment of the sub-band acoustic echo canceller according to the present invention.

Next, a description will be given of a modification of the second embodiment of the sub-band acoustic echo canceller shown in FIG. 13, by referring to FIG. 16. In FIG. 16, those parts which are the same as those corresponding parts in FIG. 13 are designated by the same reference numerals, and a description thereof will be omitted. In this modification, a doubletalk detection control part 80 is additionally provided.

As shown in FIG. 16, the doubletalk detection control part 80 includes a doubletalk detection circuit 81 and an echo canceller 82 which is provided exclusively for detecting the doubletalk. The echo canceller 82 is made up of an ADF and a subtractor, and is provided independently of the normal echo canceller group 4.

In this modification of the second embodiment, one of the band signals output from the division and decimation process part 2 is supplied to the echo canceller 82 to operate this echo canceller 82. The echo canceller 82 normally carries out an adaptive operation, and the doubletalk detection circuit 82 monitors the echo suppression quantity and judges whether or not the present state is the doubletalk state. For example, the doubletalk detection circuit 82 detects the doubletalk state when the echo suppression quantity is less than or equal to 15 dB. When the doubletalk state is detected, the doubletalk detection circuit 81 stops the tap coefficient renewal control of all echo cancellers of the echo canceller group 4 which are carrying out a normal operation.

The doubletalk detection control part 80 may have a construction which will be described later in conjunction with the fourth embodiment of the sub-band acoustic echo canceller according to the present invention.

Of course, modifications of the first and third embodiments may be realized by providing a doubletalk detection control part similarly to the modification of the second embodiment.

In addition, in each of the embodiments, the decimation process is not limited to the 1/N or 2/N decimation described above, and it is possible to carry out a r/N decimation, where $r < N$.

According to the first and third embodiments of the sub-band acoustic echo canceller, the transmission signal passes through the division and decimation process part 2 and the interpolation and synthesis process part 3 (or 7) before being transmitted to the line. For this reason, a ripple component is mixed to the transmission signal at the filter bank and synthesis filter of these process parts and causes a distortion of the transmission signal. In order to reduce this distortion of the transmission signal, it is necessary to minimize the passband ripple characteristics of the filter bank and the synthesis filter. As a result, the design of the filter becomes restricted and the order of the filter becomes large. But when the order of the filter is large, the delay time of the transmission signal introduced at the filter part becomes large.

On the other hand, according to the second embodiment of the sub-band acoustic echo canceller, the transmission signal is transmitted to the line without passing through the filter and the transmission signal will not be distorted by the ripple of the filter. However, since the second embodiment is not designed to cancel the filter ripple component which is mixed to the echo using the subtractor 6 shown in FIG. 15 as in the case of the third embodiment, the echo suppression quantity is poorer compared to that of the third embodiment. In order to increase the echo suppression quantity in the second embodiment, it is necessary to minimize the passband ripple characteristics of the filter banks 11 and 21 and the synthesis filter 32, and the order of the filter becomes large. As a result, the signal delay of the transmission signal becomes large.

Next, a description will be given of embodiments in which the order of the filter is minimized to reduce the distortion of the transmission signal while maintaining a satisfactory echo suppression quantity.

First, a description will be given of an operating principle of a fourth embodiment of the sub-band acoustic echo canceller according to the present invention, by referring to FIG. 17. The sub-band acoustic echo canceller shown in FIG. 17 generally includes a detection part 80, first and second division and decimation process parts 81 and 82, an echo canceller group 84, first and second interpolation and synthesis process parts 83 and 87, a delay part 85, a subtracting part 86, and a selection part 88.

The first division and decimation process part 81 divides a reception signal from a line into N channels and subjects N band signals to a decimation by an oversampling, where N is an integer greater than or equal to two. The second division and decimation process part 82 divides a transmission signal into N channels and subjects N band signals to a decimation by an oversampling. The echo canceller group 84 generates a pseudo echo in each band based on the band signals from the first division and decimation process part 81 by referring to the band signals from the second division and decimation process part 82. The first interpolation and synthesis process part 83 subjects the pseudo echo of each band received from the echo canceller group 84 to interpolation and synthesis to output a synthesized pseudo echo. The second interpolation and synthesis process part 87 subjects each band signal received from the second division and decimation process part 82 to interpolation and synthesis to output a synthesized transmission signal.

The delay part 85 delays the transmission signal, and the selection part 88 selectively outputs one of the outputs of the second interpolation and synthesis process part 87 and the delay part 85. The subtracting part 86 generates a residual signal from the output signal of the selection part 88 and the synthesized pseudo echo received from the first interpolation and synthesis process part 83. The detection part 80 detects whether or not only the transmission signal exists or both the transmission signal and the reception signal exist simultaneously, and outputs a detection signal when one of these states is detected. The echo cancelling operation in each band is carried out in the complex signal region. The selection part 88 selectively outputs the output signal of the delay part 85 when the output detection signal of the detection part 80 exists, and selectively outputs the output signal of the second interpolation and synthesis process part 87 when no output detection signal of the detection part 80 exists.

The detection part 80 may be formed by an echo canceller and a judging part. The echo canceller of the detection part 80 constantly carries out an adaptive operation using a band signal of one band from each of the first and second division and decimation process parts 81 and 82. The judging part of the detection part 80 judges whether or not only the transmission signal exists or both the transmission signal and the reception signal exist simultaneously.

For example, the first and second division and decimation process parts 81 and 82 may respectively be formed by a group of N polyphase filters and an N-point inverse discrete Fourier transform circuit while the first and second interpolation and synthesis process parts 83 and 87 are respectively formed by an N-point inverse discrete Fourier transform circuit and a group of N polyphase filters, so as to carry out a 2/N decimation. Alternatively, the first and second division and decimation process parts 81 and 82 may respectively be formed by a group of 2N polyphase filters and a 2N-point inverse discrete Fourier transform circuit while the first and second interpolation and synthesis process parts 83 and 87 are respectively formed by a 2N-point inverse discrete Fourier transform circuit and a group of 2N polyphase filters, so as to carry out a 1/N decimation.

This embodiment is based on the following.

That is, when the transmission signal does not exist, no distortion of the transmission signal can occur. Hence, in this case, it is sufficient to finally obtain a large echo suppression quantity even when the passband ripple of the filter is large. Therefore, the third embodiment shown in FIG. 15 is suited for this purpose.

On the other hand, in the doubletalk state in which only the transmission signal exists or both the transmission signal and the reception signal exist simultaneously, the second embodiment shown in FIG. 13 is suited for the purpose of not distorting the transmission signal. In this case, the echo suppression quantity decreases if the order of the filter is not large, but the echo suppression quantity may be low because no echo suppression is required when only the transmission signal exists. In addition, the time in which both the transmission signal and the reception signal exist simultaneously is a relatively short compared to the total time, and the deterioration of the quality of the call is negligible from the practical point of view even when slight echo remains due to the existence of the transmission signal.

Based on the above, this fourth embodiment permits the passband ripple characteristic of the filter to be large to a certain extent. In other words, when the detection part 80 detects the existence of the transmission signal, the structure of the second embodiment shown in FIG. 13 is used by selectively outputting the output signal of the delay part 85 from the selection part 88, thereby suppressing the distortion of the transmission signal although a large echo suppression quantity cannot be obtained. On the other hand, during the normal operation, the structure of the third embodiment shown in FIG. 15 is used by selectively outputting the output signal of the second interpolation and synthesis process part 87 from the selection part 88, thereby obtaining a large echo suppression characteristic.

Therefore, according to this embodiment, the order of the filter may be designed to be small because the passband ripple of the filter may be large. As a result, it is possible to minimize the signal delay time caused by the delay part 85 and the like.

When the detection part 80 is formed by the echo canceller and the judging part and the doubletalk state is detected depending on the echo suppression quantity of the echo canceller, it is possible to quickly respond to the deterioration of the echo suppression characteristic caused by a change in the echo path or the like and restore the echo suppression quantity because the echo canceller of the detection part 80 constantly carries out an adaptive operation. Accordingly, even when a change in the echo path occurs, the doubletalk detection can be made positively without being greatly affected by the change in the echo path.

In addition, it is possible to reduce the signal processing quantity when the polyphase filter group and the inverse discrete Fourier transform circuit are used to form the division and decimation process parts 81 and 82 and the interpolation and synthesis process parts 83 and 87.

Figure 18:
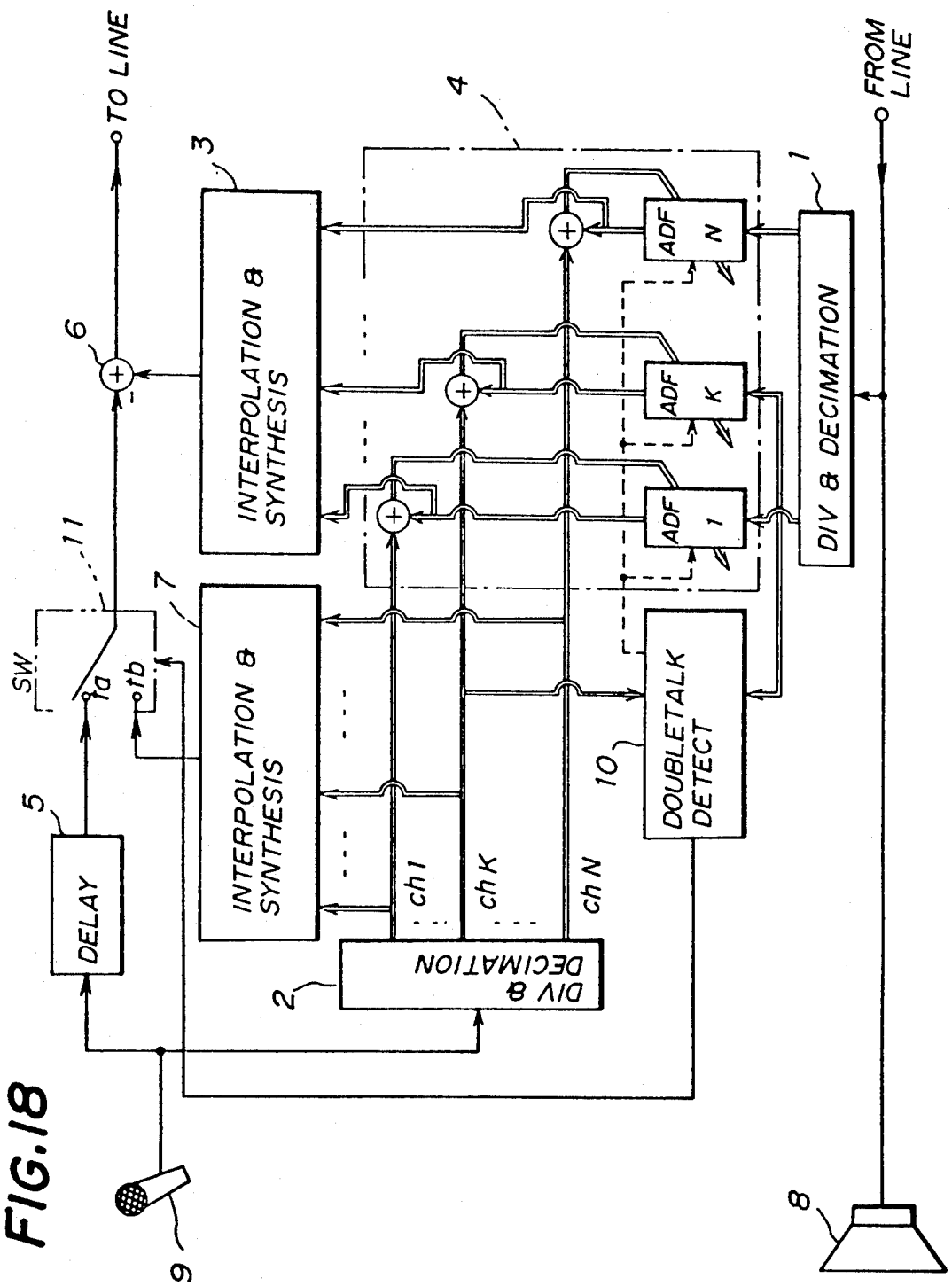
FIG. 18 is a system block diagram showing the fourth embodiment of the sub-band acoustic echo canceller.

Next, a more detailed description of the fourth embodiment will be given with reference to FIG. 18. In FIG. 18, those parts which are the same as those corresponding parts in FIGS. 13 and 15 are designated by the same reference numerals, and a description thereof will be omitted.

Figure 17:
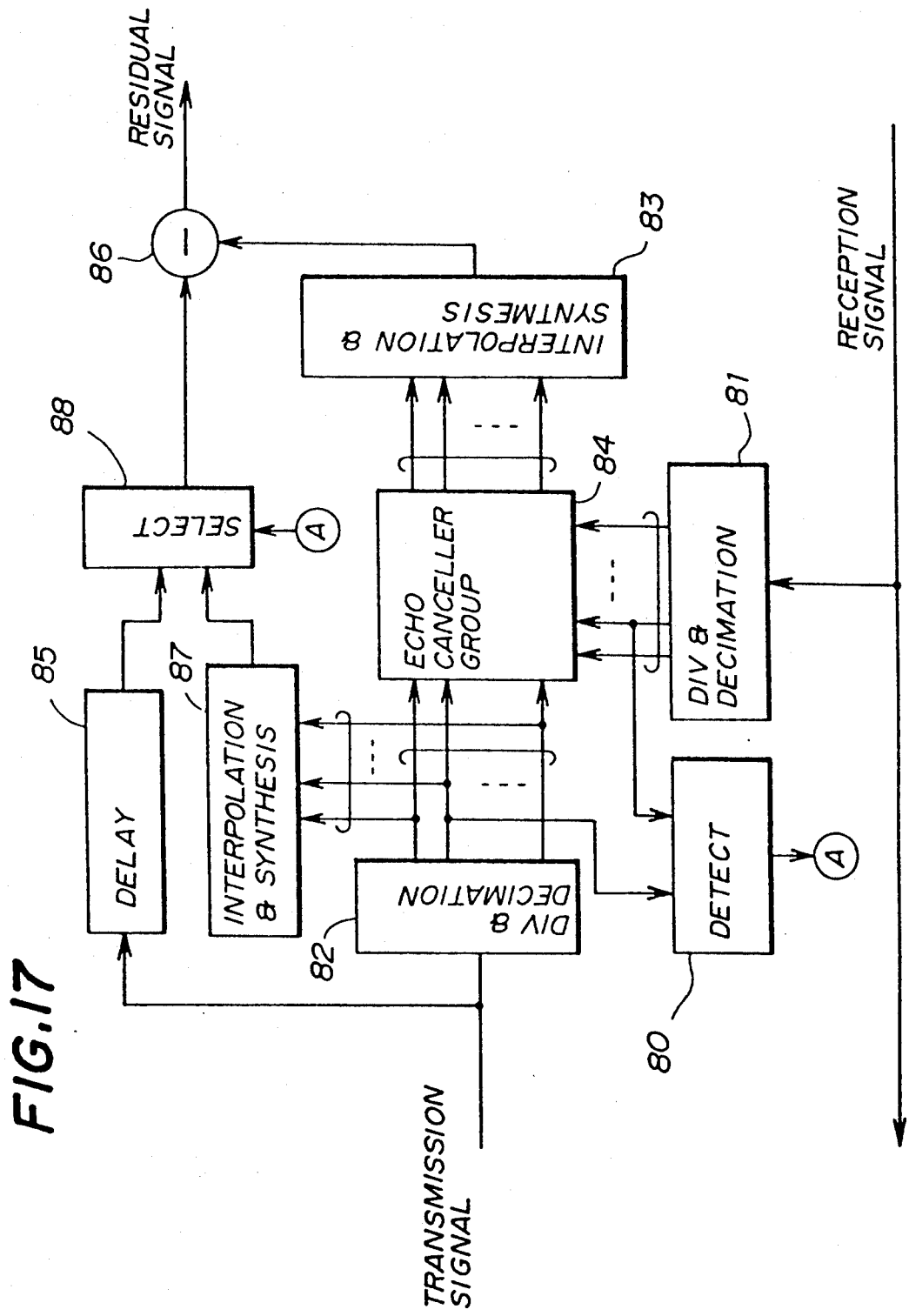
FIG. 17 is a system block diagram for explaining an operating principle of a fourth embodiment of the sub-band acoustic echo canceller according to the present invention.

In FIG. 18, a doubletalk detector 10 corresponds to the detection part 80 shown in FIG. 17, and a switching part 11 corresponds to the selection part 88 shown in FIG. 17. As will be described later in more detail, the doubletalk detector 10 operates the echo canceller thereof which constantly carries out an adaptive operation responsive to the signals of one band received from the reception and transmission sides, and the doubletalk state is detected by monitoring the echo suppression quantity of this echo canceller. In this embodiment, the doubletalk state refers to a state in which only the transmission signal exists or both the transmission signal and the reception signal exist simultaneously. In addition, the output signal of the delay circuit is supplied to a terminal ta of the switching part 11 and the output signal of the interpolation and synthesis process part 7 is supplied to a terminal tb of the switching part 11. The switching part 11 connects to the terminal ta in response to the output detection signal of the doubletalk detection part 10, that is, when the doubletalk detection part 10 detects the doubletalk state. On the other hand, the switching part 11 connects to the terminal tb when no detection signal is received from the doubletalk detection part 10.

Figure 19:
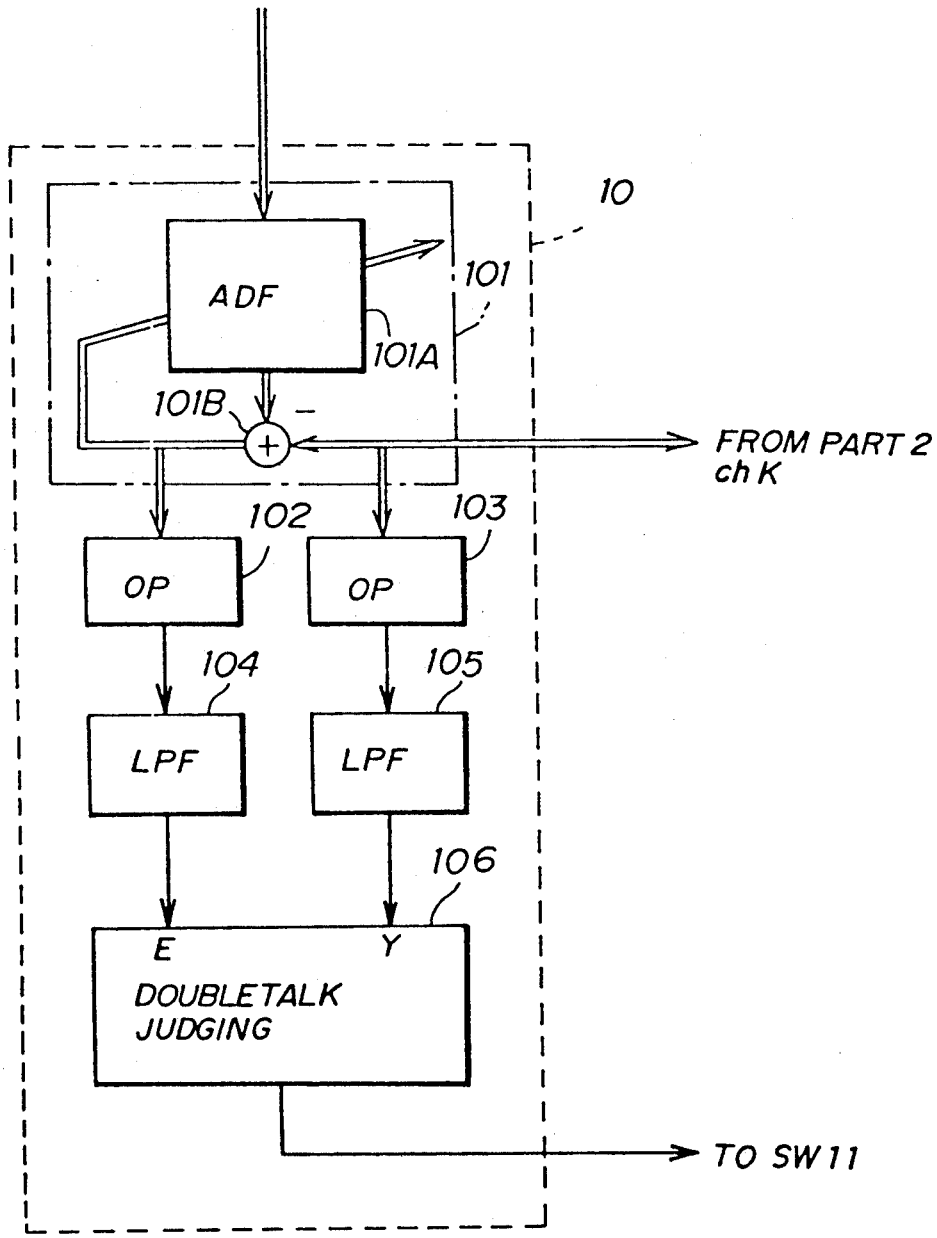
FIG. 19 is a system block diagram showing an embodiment of a doubletalk detection part shown in FIG. 18.

FIG. 19 shows an embodiment of the doubletalk detection part 10. The doubletalk detection part 10 includes an echo canceller 101, operation parts 102 and 103, lowpass filters 104 and 105, and a doubletalk judging part 106.

The echo canceller 101 is made up of an ADF 101A which constantly carries out an adaptive operation and a subtractor 101B. The band signals of one band received from the division and decimation process parts 1 and 2 are respectively supplied to the ADF 101A and the subtractor 101B.

The operation part 102 obtains a square of an absolute value of a residual signal output from the echo canceller 101, while the operation part 103 obtains a square of an absolute value of the transmission signal of one band which is received from the division and decimation process part 2. The lowpass filter 104 filters an output signal of the operation part 102, and an average power E of the residual signal is obtained by the operation part 102 and the lowpass filter 104. On the other hand, the lowpass filter 105 filters an output of the operation part 103, and an average power Y of the transmission signal of the one band is obtained by the operation part 103 and the lowpass filter 105.

The doubletalk judging part 106 calculates a ratio of the average power E obtained from the lowpass filter 104 and the average power Y obtained from the lowpass filter 105 and obtains an echo suppression quantity ERLE (echo return loss enhancement) based on the following formula (9).

$$ERLE = 10 \log_{10}(Y/E) \qquad (9)$$

The doubletalk judging part 106 compares the echo suppression quantity ERLE with threshold values in order to detect the doubletalk state in which only the transmission signal exists or both the transmission signal and the reception signal exist simultaneously. When the doubletalk judging part 106 detects the doubletalk state, the doubletalk detection signal is supplied to the switching part 11 to connect the switching part 11 to the terminal ta.

Next, a more detailed description will be given of the operation of this fourth embodiment. First, during the normal operation in which no doubletalk state is detected, no doubletalk detection signal is output from the doubletalk detection part 10. Accordingly, the switching part 11 is connected to the terminal tb and selectively outputs the output signal of the interpolation and synthesis process part 7. Since no transmission signal from the microphone 9 exists during the normal operation, there is no transmission signal from the interpolation and synthesis process part 7. Even when an output signal of the interpolation and synthesis process part 7 does exist, this output signal is the echo generated by the reception signal which is picked up by the microphone 9. Accordingly, the transmission signal will not be distorted by the ripple which would mix into the transmission signal at the division and decimation process part 2 and the interpolation and synthesis process part 7. On the other hand, when only the reception signal exists, the ripple which is mixed to the echo component is cancelled at the subtractor 6 as described above in respect to the third embodiment with reference to FIG. 15. Hence, even when the order of the filter is small in each of the path on the side of the interpolation and synthesis process part 3 and the path on the side of the interpolation and synthesis process part 7 and the passband ripple characteristic is large, it is possible to finally obtain a large echo suppression quantity.

On the other hand, when the doubletalk state is detected by the doubletalk detection part 10, the switching part 11 is connected to the terminal ta responsive to the doubletalk detection signal. In this case, the transmission signal will not be distorted because the transmission signal does not pass through the filter bank and the synthesis filter. With regard to the ripple component of the echo, the cancelling effect of the third embodiment shown in FIG. 15 cannot be obtained, and the echo suppression quantity deteriorates if the order of the filter is not large. However, when only the transmission signal exists in the doubletalk state, the echo suppression quantity does not become a problem because the echo itself does not exist. And, when both the transmission signal and the reception signal exist simultaneously in the doubletalk state, it may be assumed that this state only lasts for a short time. Furthermore, when the transmission signal exists, the slight deterioration of the echo suppression quantity does not deteriorate the quality of the call from the practical point of view, and no problems are introduced by the large passband ripple of the filter.

During the time in which the doubletalk detection part 10 detects the doubletalk state, the tap coefficient renewal of the echo canceller group 4 is stopped.

Figure 20:
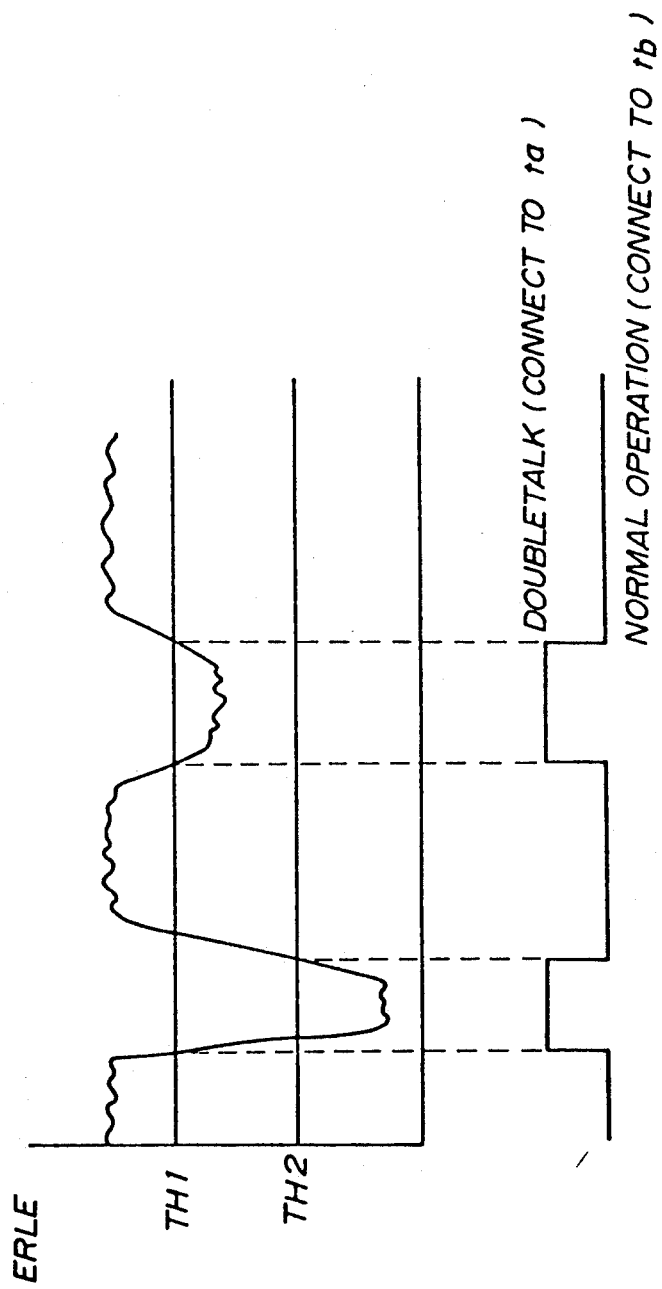
FIG. 20 is a diagram for explaining an operation of the doubletalk detection part.

A more detailed description will now be given of the operation of the doubletalk detection part 10, by referring to FIG. 20. The doubletalk judging part 106 of the doubletalk detection part 10 compares the echo suppression quantity ERLE with two threshold values TH1 and TH2. The doubletalk state is detected when the echo suppression quantity ERLE calculated in the doubletalk judging part 106 becomes less than the threshold value TH1. When the echo suppression quantity ERLE becomes smaller than the threshold value TH2, the doubletalk detection is cancelled when the echo suppression quantity ERLE is again restored and becomes greater than the threshold value TH2. In other words, when the doubletalk detection is cancelled, the doubletalk state is no longer detected and the tap coefficient renewal control of the echo canceller group 4 is started so that the echo canceller group 4 can be restored quickly. When the echo suppression quantity ERLE does not become less than the threshold value TH2, the doubletalk detection is cancelled when the echo suppression quantity ERLE is restored to the threshold value TH1.

The doubletalk detection part 10 has the following characteristics. That is, the conventional doubletalk detection is made by detecting the levels of the reception signal and the transmission signal and comparing a ratio of the detected levels with a threshold value. But according to this conventional doubletalk detection, a doubletalk is erroneously detected in an echo canceller of an acoustic system when a change occurs in the attenuation/gain characteristic of the echo path. The undesirable effects of such an erroneous doubletalk detection caused by the change in the echo path are notable, and it is desirable to accurately detect only the doubletalk state.

In the doubletalk detection part 10 of this embodiment, the echo canceller 101 constantly carries out an adaptive operation and the doubletalk is detected depending on the echo suppression quantity thereof. For this reason, even if the echo suppression quantity decreases due to a change in the attenuation/gain characteristic of the echo path, the echo canceller 101 can quickly follow the change and restore the echo suppression quantity. As a result, no substantial effects are introduced even when the characteristic of the echo path changes slightly, and the doubletalk can be detected positively. Therefore, a stable doubletalk detection is ensured. In addition, the signal processing quantity in the doubletalk detection part 10 can be minimized because the signal processing is carried out only with respect to the signals of one band.

Next, the improved echo suppression quantity obtainable by the fourth embodiment of the sub-band acoustic echo canceller will be described with reference to FIGS. 21 and 22.

Figure 21:
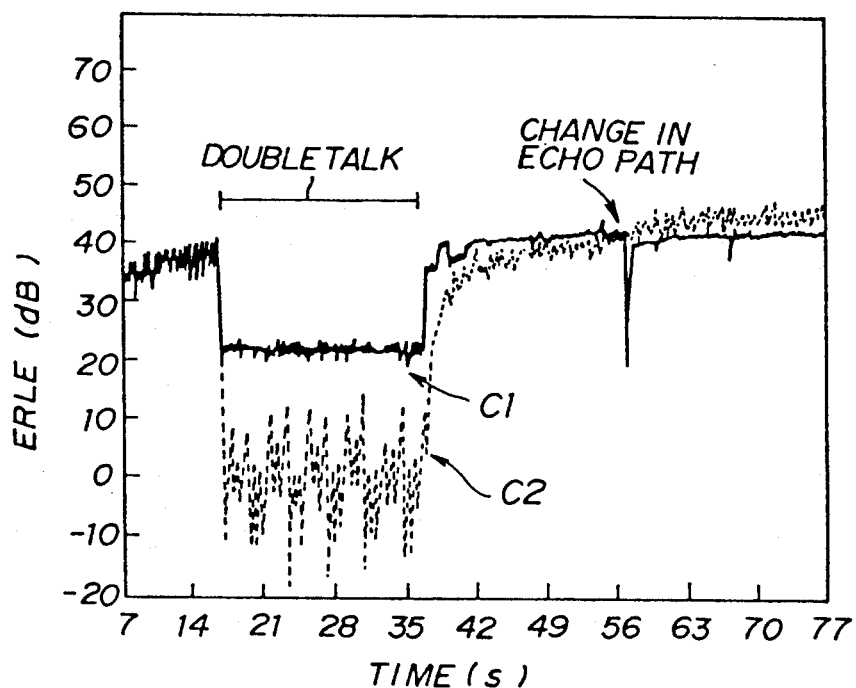
FIGS. 21 and 22 are diagrams for explaining an improved echo suppression quantity obtainable by the fourth embodiment of the sub-band acoustic echo canceller.

FIG. 21 shows the echo suppression characteristic obtained in the fourth embodiment when the conditions in respect of the division filter and the synthesis filter are such that the ripple within the band is 0.85 dB and the order of the filter is 161. The threshold value TH1 of the doubletalk detection part 10 is 20 dB, and the threshold value TH2 is 30 dB. In FIG. 21, C1 indicates an echo suppression characteristic at the output side of the subtractor 6, and C2 indicates an echo suppression characteristic of the echo canceller 101 within the doubletalk detection part 10.

Figure 22:
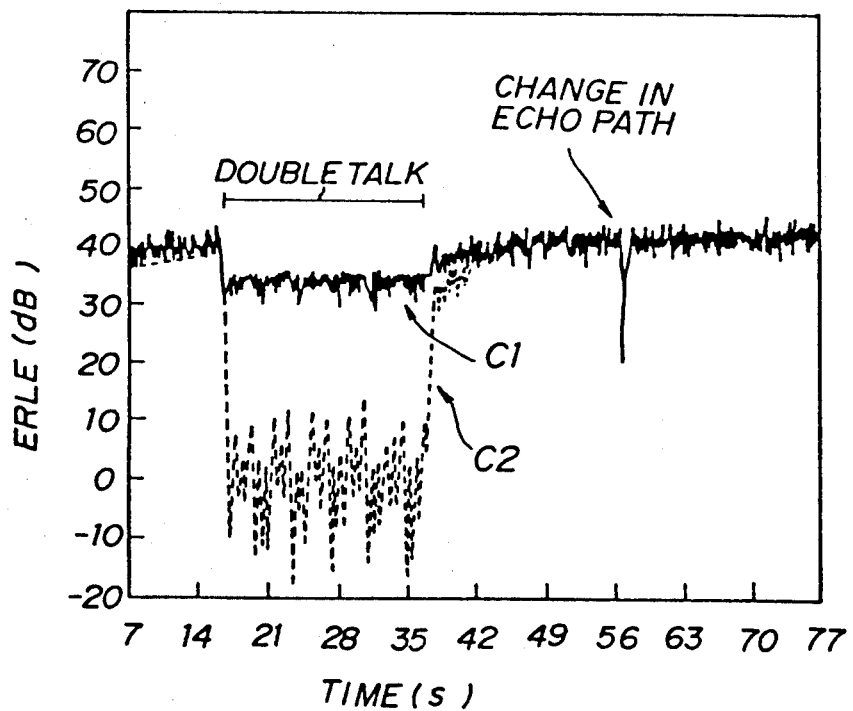

FIG. 22 shows the echo suppression characteristic obtained in the fourth embodiment when the conditions in respect of the division filter and the synthesis filter are such that the ripple within the band is 0.04 dB and the order of the filter is 385. In FIG. 22, C1 indicates the echo suppression characteristic at the output side of the subtractor 6, and C2 indicates the echo suppression characteristic of the echo canceller 101 within the doubletalk detection part 10.

In FIG. 21, the echo suppression characteristic C1 during the doubletalk detection is deteriorated compared to that during the normal operation, but in total the characteristic is improved compared to that of the second embodiment shown in FIG. 13.

It may be seen from FIG. 21 that the echo canceller 101 of the doubletalk detection part 10 quickly follows the change in the characteristic of the echo path and the echo suppression quantity undergoes virtually no deterioration. Hence, the echo suppression characteristic of the sub-band acoustic echo canceller as a whole will not deteriorate even when the change occurs in the echo path.

In the case of FIG. 22, the echo suppression quantity ERLE of 30 dB or greater is obtained even during the doubletalk state, and the construction shown in FIG. 13 may be employed if the above filter conditions are satisfied. However, when the sampling operation at 16 kHz is considered, the delay time of the transmission signal becomes approximately 23 msec which is relatively large. On the other hand, the delay time of the transmission signal becomes approximately 10 msec which is smaller under the filter conditions of FIG. 21.

Further, the present invention is not limited to these embodiments, but various variations and modifications may be made without departing from the scope of the present invention.

What is claimed is:

1. A sub-band acoustic echo canceller comprising:

first division and decimation process means for dividing a reception signal from a line into first band signals of N channels and for decimating each of the first band signals to output decimated first band signals in a form of complex signals, where N is an integer greater than or equal to two;

second division and decimation process means for dividing a transmission signal into second band signals of N channels and for decimating each of the second band signals to output decimated second band signals in a form of complex signals;

an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means and for outputting a residual signal in each band by subtracting the pseudo echo of one band from the decimated second band signal of the same band; and interpolation and synthesis process means for subjecting the residual signals received from said echo canceller group to interpolation and synthesis to output a synthesized residual signal, wherein a signal obtained by subtracting the synthesized residual signal from the data transmitted is transmitted to a line as the transmission signal, said echo canceller group carrying out an echo cancelling operation for each band in a complex signal region, said first and second division and decimation process means respectively carrying out a r/N decimation, where r<N, wherein said first and second division and decimation process means each include a first division part formed of a group of N polyphase filters and a second decimation part formed of an N-point inverse discrete Fourier transform circuit, and said interpolation and synthesis process means includes an N-point inverse discrete Fourier transform circuit and a group of N polyphase filters, so that a 2/N decimation is carried out.

2. A sub-band acoustic echo canceller comprising:

first division and decimation process means for dividing a reception signal from a line into first band signals of N channels and for decimating each of the first band signals to output decimated first band signals in a form of complex signals, where N is an integer greater than or equal to two;

second division and decimation process means for dividing a transmission signal into second band signals of N channels and for decimating each of the second band signals to output decimated second band signals in a form of complex signals;

an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means and for outputting a residual signal in each band by subtracting the pseudo echo of one band from the decimated second band signal of the same band; and interpolation and synthesis process means for subjecting the residual signals received from said echo canceller group to interpolation and synthesis to output a synthesized residual signal, wherein a signal obtained by subtracting the synthesized residual signal from the data transmitted is transmitted to a line as the transmission signal, said echo canceller group carrying out an echo cancelling operation for each band in a complex signal region, said first and second division and decimation process means respectively carrying out a r/N decimation, where r<N, wherein said first and second division and decimation process means each includes a first division part formed of a group of 2N polyphase filters and a second decimation part formed of a 2N-point inverse discrete Fourier transform circuit, and said interpolation and synthesis process means includes a 2N-point inverse discrete Fourier transform circuit, and a group of 2N polyphase filters, so that a 1/N decimation is carried out.

3. A sub-band acoustic echo canceller comprising:

first division and decimation process means for dividing a reception signal from a line into first band signals of N channels and for decimating each of the first band signals to output decimated first band signals, where N is an integer greater than or equal to two;

second division and decimation process means for dividing a transmission signal into second band signals of N channels and for decimating each of the second band signals to output decimated second band signals;

an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means;

interpolation and synthesis process means for subjecting each pseudo echo received from said echo canceller group to interpolation and synthesis to output synthesized pseudo echo; and subtracting means for subtracting the synthesized pseudo echo received from said interpolation and synthesis process means from the transmission signal to output a residual signal wherein a signal obtained by subtracting the residual signal from the data transmitted is transmitted to a line, said first and second division and decimation process means respectively carrying out a r/N decimation, where r<N, wherein said first and second division and decimation process means each includes a first division part formed by a group of N polyphase filters and a second decimation part formed by an N-point inverse discrete Fourier transform circuit, and said interpolation and synthesis process means includes an N-point inverse discrete Fourier transform circuit and a group of N polyphase filters, so that a 2/N decimation is carried out.

4. A sub-band acoustic echo canceller comprising:

first division and decimation process means for dividing a reception signal from a line into first band signals of N channels and for decimating each of the first band signals to output decimated first band signals, where N is an integer greater than or equal to two;

second division and decimation process means for dividing a transmission signal into second band signals of N channels and for decimating each of the second band signals to output decimated second band signals;

an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means;

interpolation and synthesis process means for subjecting each pseudo echo received from said echo canceller group to interpolation and synthesis to output a synthesized pseudo echo; and subtracting means for subtracting the synthesized pseudo echo received from said interpolation and synthesis process means from the transmission signal to output a residual signal wherein a signal obtained by subtracting the residual signal from the data transmitted is transmitted to a line, said first and second division and decimation process means respectively carrying out a r/N decimation, where r<N, wherein said first and second division and decimation process means each includes a first division part formed of a group of 2N polyphase filters and a second decimation part formed of a 2N-point inverse discrete Fourier transform circuit, and said interpolation and synthesis process means includes a 2N-point inverse discrete Fourier transform circuit and a group of 2N polyphase filters, so that a 1/N decimation is carried out.

5. A sub-band acoustic echo canceller comprising:

first division and decimation process means for dividing a reception signal from a line into first band signals of N channels and for decimating each of the first band signals to output decimated first band signals, where N is an integer greater than or equal to two;

second division and decimation process means for dividing a transmission signal into second band signals of N channels and for decimating each of the second band signals to output decimated second band signals;

an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means;

interpolation and synthesis process means for subjecting each pseudo echo received from said echo canceller group to interpolation and synthesis to output a synthesized pseudo echo; and subtracting means for subtracting the synthesized pseudo echo received from said interpolation and synthesis process means from the transmission signal to output a residual signal wherein a signal obtained by subtracting the residual signal from the data transmitted is transmitted to a line as the transmission signal;

and further comprising a delay circuit for delaying the transmission signal which is supplied to said subtracting means.

6. A sub-band acoustic echo canceller comprising:

first division and decimation process means for dividing a reception signal from a line into first band signals of N channels and for decimating each of the first band signals to output decimated first band signals, where N is an integer greater than or equal to two;

second division and decimation process means for dividing a transmission signal into second band signals of N channels and for decimating each of the second band signals to output decimated second band signals;

an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means;

first interpolation and synthesis process means for subjecting each decimated second band signal received from said second division and decimation process means to interpolation and synthesis to output a synthesized transmission signal;

second interpolation and synthesis process means for subjecting each pseudo echo received from said echo canceller group to interpolation and synthesis to output a synthesized pseudo echo; and subtracting means for subtracting the synthesized pseudo echo received from said interpolation and synthesis process means from the synthesized transmission signal received from said first interpolation and synthesis process means to output a residual signal wherein a signal obtained by subtracting the residual signal from the data transmitted is transmitted to a line as the transmission signal.

7. The sub-band acoustic echo canceller as claimed in claim 6, wherein said first and second division and decimation process means respectively carry out a r/N decimation, where r<N.

8. The sub-band acoustic echo canceller as claimed in claim 7, wherein said first and second division and decimation process means each includes a first division part formed by a group of N polyphase filters and a second decimation part formed by an N-point inverse discrete Fourier transform circuit, and said first and second interpolation and synthesis process means respectively include an N-point inverse discrete Fourier transform circuit and a group of N polyphase filters, so that a 2/N decimation is carried out.

9. The sub-band acoustic echo canceller as claimed in claim 7, wherein said first and second division and decimation process means each includes a first division part formed by a group of 2N polyphase filters and a second decimation part formed by a 2N-point inverse discrete Fourier transform circuit, and said first and second interpolation and synthesis process means respectively include a 2N-point inverse discrete Fourier transform circuit and a group of 2N polyphase filters, so that a 1/N decimation is carried out.

10. The sub-band acoustic echo canceller as claimed in claim 6, wherein said echo canceller group includes for each band an adaptive digital filter for a generating a pseudo echo based on a corresponding one of the decimated first band signals received from said first division and decimation process means, and a subtractor for obtaining a residual signal by subtracting the pseudo echo from a corresponding one of the decimated second band signals received from said second division and decimation process means, each of said adaptive digital filters renewing tap coefficients thereof by referring to the residual signal output from a corresponding subtractor.

11. The sub-band acoustic echo canceller as claimed in claim 6, which further comprises doubletalk detection means for detecting a doubletalk based on one of the decimated first band signals and one of the decimated second band signals of the same band respectively received from said first and second division and decimation process means and for stopping a tap coefficient renewal control of the echo cancellers within said echo canceller group when the double talk is detected.

12. The sub-band acoustic echo canceller as claimed in claim 6, wherein the echo cancelling operation in each band is carried out in a complex signal region.

13. A sub-band acoustic echo canceller comprising:
first division and decimation process means for dividing a reception signal from a line into first band signals of N channels and for decimating each of the first band signals to output decimated first band signals, where N is an integer greater than or equal to two;
second division and decimation process means for dividing a transmission signal into second band signals of N channels and for decimating each of the second band signals to output decimated second band signals;
an echo canceller group made up of a group of echo cancellers for generating a pseudo echo in each band based on a corresponding one of the decimated first band signals received from said first division and decimation process means by referring to a corresponding one of the decimated second band signals received from said second division and decimation process means;
first interpolation and synthesis process means for subjecting each pseudo echo received from said echo canceller group to interpolation and synthesis to output a synthesized pseudo echo;
second interpolation and synthesis process means for subjecting each decimated second band signals received from said second division and decimation process means to interpolation and synthesis to output a synthesized transmission signal;
delay means for delaying the transmission signal from the line;
selection means for selectively outputting one of output signals of said second interpolation and synthesis process means and said delay means;
subtracting means for obtaining a residual signal by subtracting the synthesized pseudo echo received from said first interpolation and synthesis process means from an output signal received from said selection means; and
doubletalk detection means for detecting a state of doubletalk in which only the transmission signal exists or both the transmission and the reception signal exist simultaneously and outputting a detection signal when a state of doubletalk is detected,
said echo canceller group carrying out an echo cancelling operation for each band in a complex signal region,
said selection means being responsive to said detection signal and selectively outputting the synthesized transmission signal received from said second interpolation and synthesis process means when no detection signal is received from said detection means and selectively outputting a delayed transmission signal received from said delay means when the detection signal is received from the detection means.

14. The sub-band acoustic echo canceller as claimed in claim 13, wherein said detection means includes an echo canceller part which constantly carries out an adaptive operation using one of the decimated first band signals and one of the decimated second band signals respectively received from said first and second division and decimation process means, and a judging part for judging whether or not the doubletalk is detected based on an echo suppression quantity of said echo canceller part and for outputting the detection signal when the doubletalk is detected.

15. The sub-band acoustic echo canceller as claimed in claim 13, wherein said first and second division and decimation process means respectively carry out a r/N decimation, where r<N.

16. The sub-band acoustic echo canceller as claimed in claim 15, wherein said first and second division and decimation process means each includes a first division not formed of a group of N polyphase filters and a second decimation part formed of an N-point inverse discrete Fourier transform circuit, and said first and second interpolation and synthesis process means respectively include an N-point inverse discrete Fourier transform circuit and a group of N polyphase filters, so that a 2/N decimation is carried out.

17. The sub-band acoustic echo canceller as claimed in claim 15, wherein said first and second division and decimation process means each includes a first division part formed of a group of 2N polyphase filters and a second decimation part formed of a 2N-point inverse discrete Fourier transform circuit, and said first and second d interpolation and synthesis process means respectively include a 2N-point inverse discrete Fourier transform circuit, and said first and second interpolation and synthesis process means respectively include a 2N-point inverse discrete Fourier transform circuit and a group of 2N polyphase filters, so that a 1/N decimation is carried out.

18. The sub-band acoustic echo canceller as claimed in claim 13, wherein said echo canceller group includes for each band an adaptive digital filter for a generating a pseudo echo based on a corresponding one of the decimated first band signals received from said first division and decimation process means, and a subtractor for obtaining a residual signal by subtracting the pseudo echo from a corresponding one of the decimated second band signals received from said second division and decimation process means, each of said adaptive digital filters renewing tap coefficients thereof by referring to the residual signal output from a corresponding subtractor.

19. The sub-band acoustic echo canceller as claimed in claim 18, wherein said detection means detects the doubletalk based on one of the decimated first band signals and one of the decimated second band signals respectively received from said first and second division and decimation process means and is operative for stopping a tap coefficient renewal of said adaptive filters when the doubletalk is detected.

* * * * *